US012696350B2

(12) United States Patent
Peng et al.

(10) Patent No.: US 12,696,350 B2
(45) Date of Patent: Jul. 28, 2026

(54) CONNECTION RELEASE METHOD AND APPARATUS

(71) Applicant: Huawei Technologies Co., Ltd., Shenzhen (CN)

(72) Inventors: Wenjie Peng, Shanghai (CN); Mingzeng Dai, Shenzhen (CN); Jun Wang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 327 days.

(21) Appl. No.: 17/452,896

(22) Filed: Oct. 29, 2021

(65) Prior Publication Data

US 2022/0046751 A1 Feb. 10, 2022

Related U.S. Application Data

(63) Continuation of application No. PCT/CN2020/086331, filed on Apr. 23, 2020.

(30) Foreign Application Priority Data

Apr. 30, 2019 (CN) ......................... 201910365507.X

(51) Int. Cl.
*H04W 76/38* (2018.01)
*H04L 5/00* (2006.01)
(Continued)

(52) U.S. Cl.
CPC ........... *H04W 76/38* (2018.02); *H04L 5/0053* (2013.01); *H04W 76/25* (2018.02); *H04W 92/18* (2013.01)

(58) Field of Classification Search
None
See application file for complete search history.

(56) References Cited

U.S. PATENT DOCUMENTS 10,531,430 B2 1/2020 Prasad et al.
2012/0015652 A1 1/2012 Jung et al.
(Continued)

FOREIGN PATENT DOCUMENTS

CN 104144524 A 11/2014
CN 106465440 A 2/2017
(Continued)

OTHER PUBLICATIONS

U.S. Appl. No. 62/824,777, filed Mar. 27, 2019, priority document for Di Girolamo et al., US2022/0191962 (Year: 2019).*
(Continued)

*Primary Examiner* — Faruk Hamza
*Assistant Examiner* — Cassandra L Decker
(74) *Attorney, Agent, or Firm* — Slater Matsil, LLP

(57) ABSTRACT

This application provides a connection release method and apparatus. An upper layer of an access stratum of a first terminal device sends a release request message and first identifier information to a second terminal device through the access stratum, where the release request message is used to request the second terminal device to release a unicast connection, and the first identifier information is used to identify the unicast connection; and the access stratum of the first terminal device obtains release indication information, so that the access stratum of the first terminal device searches for the corresponding unicast connection based on the first identifier information, and releases, based on the release indication information, a configuration of the access stratum corresponding to the unicast connection, to release the access stratum.

17 Claims, 4 Drawing Sheets

First terminal device

Upper layer

S320: Detect a unicast connection

S310: Fourth indication information

Access stratum

(51) Int. Cl.
　　*H04W 76/25*　　　(2018.01)
　　*H04W 92/18*　　　(2009.01)

(56)　　　　References Cited

U.S. PATENT DOCUMENTS

| | | | | |
|---|---|---|---|---|
| 2012/0294157 A1* | 11/2012 | Guo | ........................ | H04L 43/10 |
| | | | | 370/251 |
| 2014/0341148 A1* | 11/2014 | Keskitalo | .............. | H04W 28/16 |
| | | | | 370/329 |
| 2015/0085791 A1* | 3/2015 | Baghel | .................. | H04W 76/14 |
| | | | | 370/329 |
| 2017/0048922 A1* | 2/2017 | Lee | ........................ | H04W 76/38 |
| 2018/0234995 A1 | 8/2018 | Jung et al. | | |
| 2019/0089579 A1 | 3/2019 | Sang et al. | | |
| 2019/0149968 A1* | 5/2019 | Watfa | .................... | H04W 4/023 |
| | | | | 455/41.2 |
| 2019/0394816 A1 | 12/2019 | Kim | | |
| 2020/0163145 A1* | 5/2020 | Park | .................... | H04W 76/18 |
| 2020/0229007 A1* | 7/2020 | Jung | .................... | H04W 72/04 |
| 2020/0252989 A1* | 8/2020 | Chen | .................... | H04W 76/19 |
| 2020/0267799 A1* | 8/2020 | Lee | ........................ | H04W 76/34 |
| 2021/0211870 A1* | 7/2021 | Perras | .................... | H04W 4/40 |
| 2021/0251023 A1* | 8/2021 | Phan | ........................ | H04W 4/70 |
| 2021/0368372 A1* | 11/2021 | Chen | .................... | H04W 24/08 |
| 2021/0410129 A1* | 12/2021 | Freda | .................. | H04W 72/543 |

| | | | | |
|---|---|---|---|---|
| 2022/0191962 A1* | 6/2022 | Di Girolamo | ........ | H04L 5/0053 |
| 2022/0201790 A1* | 6/2022 | Jung | .................... | H04W 76/20 |

FOREIGN PATENT DOCUMENTS

| | | | | |
|---|---|---|---|---|
| CN | 107637106 A | 1/2018 | | |
| CN | 107771410 A | 3/2018 | | |
| WO | 2016190687 A1 | 12/2016 | | |
| WO | WO-2016210048 A1 * | 12/2016 | ........... | H04W 4/021 |
| WO | 2018155908 A1 | 8/2018 | | |

OTHER PUBLICATIONS

3GPP TS 24.334 V15.2.0 (Sep. 2018), 3rd Generation Partnership Project; Technical Specification Group Core Network and Terminals; Proximity-services (ProSe) User Equipment (UE) to ProSe function protocol aspects; Stage 3 (Release 15), 264 pages.
ITL, "Considerations on PC5 link release for multiple remote UEs", 3GPP TSG RAN WG2 Meeting #92, R2-156321, Anaheim, California, US, Nov. 16-20, 2015, 7 pages.
Ericsson, "Rapporteur corrections", 3GPP TSG-RAN WG2 Meeting #98, R2-1705380, Hangzhou, China, May 15-19, 2017, 77 pages.
"V2X UE behaviour upon releasing a unicast/groupcast session", ITL, 3GPP TSG-RAN WG2 Meeting 104, Spokane, USA, Nov. 12-16, 2018, R2-1818205, total 2 pages.

* cited by examiner

CONNECTION RELEASE METHOD AND APPARATUS

CROSS-REFERENCE TO RELATED APPLICATIONS

This application is a continuation of International Application No. PCT/CN2020/086331, filed on Apr. 23, 2020, which claims priority to Chinese Patent Application No. 201910365507.X, filed on Apr. 30, 2019. The disclosures of the aforementioned applications are hereby incorporated by reference in their entireties.

TECHNICAL FIELD

This application relates to the communication field, and more specifically, to a connection release method and apparatus.

BACKGROUND

In a device-to-device (D2D) system, unicast communication is supported between two user equipment (UEs). An upper-layer connection is set up between the two UEs in the unicast communication. An upper layer is a vehicle-to-everything (V2X) layer above an access stratum. The upper-layer connection is referred to as a PC5-S connection. D2D does not support setup of a connection for a unicast connection at the access stratum (AS), that is, both maintenance and detection of the unicast connection are performed at the V2X layer. A current unicast connection detection mechanism is a keep-alive mechanism. In the unicast connection detection mechanism, initiator user equipment (UE) sends a keep-alive message to peer UE, and starts a timer T4101 at the same time. If receiving an acknowledgment (ACK) message returned by the peer UE, the initiator UE stops the timer T4101, and the keep-alive procedure ends. In this case, it is considered that a connection between the two UEs still exists. If the initiator UE receives no ACK message from the peer UE before the timer T4101 expires, the initiator UE retransmits the keep-alive message. If the keep-alive message is retransmitted for a maximum quantity of retransmissions times, and the initiator UE still receives no ACK message from the peer UE, the initiator UE considers that the current connection does not exist.

In addition, release of an AS of a terminal device is not clearly defined in a conventional technology.

SUMMARY

In view of this, this application provides a connection release method and apparatus, to release an access stratum, and avoid or minimize a waste of resources.

According to a first aspect, a connection release method is provided. The method includes the following. An upper layer of an access stratum of a first terminal device sends a release request message and first identifier information to the access stratum of the first terminal device, where the release request message is used to request a second terminal device to release a unicast connection, and the first identifier information is used to identify the unicast connection; the access stratum of the first terminal device obtains release indication information. The access stratum of the first terminal device releases, based on the release indication information and the first identifier information, a configuration of the access stratum corresponding to the unicast connection, where the unicast connection is a unicast connection on a sidelink, and the sidelink is a wireless transmission link between the first terminal device and the second terminal device. Therefore, the access stratum of the first terminal device searches for the corresponding unicast connection based on the first identifier information, and releases, based on the release indication information, the configuration of the access stratum corresponding to the unicast connection, to release the access stratum, and help avoid or minimize a waste of resources.

In a possible implementation, that the access stratum of the first terminal device obtains release indication information includes: The upper layer of the access stratum of the first terminal device sends first indication information to the access stratum of the first terminal device, where the first indication information is used to indicate that the release request message is a unicast connection release request message, and the first indication information is the release indication information. Therefore, when obtaining the first indication information sent by the upper layer of the access stratum of the first terminal device, the access stratum of the first terminal device considers that trigger indication information is obtained, to release the access stratum.

In a possible implementation, that the access stratum of the first terminal device obtains release indication information includes: The access stratum of the first terminal device sends the release request message to an access stratum of the second terminal device; and the access stratum of the first terminal device receives a release acknowledgment message from the access stratum of the second terminal device, where the release acknowledgment message is used to respond to the release request message, and the release acknowledgment message is the release indication information. Therefore, after receiving the release acknowledgment message from the second terminal device, the access stratum of the first terminal device may consider that trigger indication information is obtained, to release the access stratum.

In a possible implementation, the method further includes: The upper layer of the access stratum of the first terminal device sends first indication information to the access stratum of the first terminal device, where the first indication information is used to indicate that the release request message is a unicast connection release request message, and the first terminal device sends a first RRC message to the second terminal device, where the first RRC message is used to indicate the second terminal device to release a configuration of an access stratum corresponding to the unicast connection. Correspondingly, that the access stratum of the first terminal device obtains release information includes: The first terminal device receives a second RRC message from the second terminal device, where the second RRC message is used to respond to the first RRC message, and the second RRC message is the release indication information. Therefore, after receiving the second RRC message from the second terminal device, the access stratum of the first terminal device may consider that trigger indication information is obtained, to release the access stratum.

In a possible implementation, the method further includes: The access stratum of the first terminal device sends the release request message to an access stratum of the second terminal device, and the upper layer of the access stratum of the first terminal device releases the unicast connection of the upper layer of the access stratum of the first terminal device. Correspondingly, that the access stratum of the first terminal device obtains release indication information includes: The upper layer of the access stratum of the first terminal device sends second indication information to the access stratum of the first terminal device, where the second indication information is used to notify the access stratum of the first terminal device that the upper layer of the first terminal device has released the unicast connection, and the second indication information is the release indication information. Therefore, after receiving the second indication information from the upper layer of the access stratum of the first terminal device, the access stratum of the first terminal device may consider that trigger indication information is obtained, to release the access stratum.

In a possible implementation, that the access stratum of the first terminal device obtains release indication information includes: The first terminal device receives third indication information from a network device, where the third indication information is used to indicate the first terminal device to release the configuration of the access stratum corresponding to the unicast connection, and the third indication information is the release indication information. Therefore, after receiving the third indication information from the network device, the access stratum of the first terminal device may consider that trigger indication information is obtained, to release the access stratum. Optionally, the method further includes: The first terminal device sends first signaling to the network device, where the first signaling includes the first identifier information.

In a possible implementation, the method further includes: The first terminal device sends a third RRC message to the second terminal device, where the third RRC message includes the release request message, and the third RRC message is used to indicate the second terminal device to release a configuration of an access stratum corresponding to the unicast connection. Correspondingly, that the access stratum of the first terminal device obtains release indication information includes: The first terminal device receives a fourth RRC message from the second terminal device, where the fourth RRC message indicates that the access stratum of the second terminal device has successfully released the configuration of the access stratum corresponding to the unicast connection, the fourth RRC message includes a release acknowledgment message, the release acknowledgment message is used to indicate that an upper layer of the access stratum of the second terminal device has successfully released the unicast connection, and the fourth RRC message is the release indication information. The access stratum of the first terminal device delivers the release acknowledgment message in the fourth RRC message to the upper layer of the access stratum of the first terminal device. Therefore, after receiving the fourth RRC message from the second terminal device, the first terminal device may consider that trigger indication information is obtained, to release the access stratum.

Optionally, in the foregoing various possible implementations, the method further includes: The first terminal device sends notification information to the network device, where the notification information is used to notify the network device that the unicast connection of the access stratum of the first terminal device has been released. Optionally, the notification information includes an updated destination identifier list. Therefore, after releasing the access stratum, the first terminal device may notify the network device, so that the network device no longer maintains a context configuration of the access stratum corresponding to the unicast connection, thereby saving resource space of the network device.

In a possible implementation, the method further includes: The access stratum of the first terminal device sends fourth indication information to the upper layer of the access stratum of the first terminal device, where the fourth indication information is used to indicate the upper layer of the access stratum of the first terminal device to detect the unicast connection. The upper layer of the access stratum of the first terminal device initiates a unicast connection detection procedure based on the fourth indication information. For example, the detection is performed by using a keep-alive mechanism. Therefore, the access stratum of the first terminal device may actively indicate the upper layer to detect the unicast connection, that is, a detection manner is relatively flexible.

In a possible implementation, the method further includes: The upper layer of the access stratum of the first terminal device determines to release the unicast connection. If determining that the unicast connection is unavailable or does not exist, the upper layer of the access stratum of the first terminal device may determine to release the unicast connection.

In a possible implementation, that the access stratum of the first terminal device sends fourth indication information to the upper layer of the first terminal device includes: The access stratum of the first terminal device sends the fourth indication information to the upper layer of the access stratum of the first terminal device based on preset time. Therefore, the access stratum of the first terminal device may indicate, based on the preset time, the upper layer of the access stratum of the first terminal device to detect the unicast connection.

Optionally, the preset time is implemented by using a timer.

According to a second aspect, a connection release method is provided. The method includes the following. A network device receives first signaling from a first terminal device, where the first signaling includes first identifier information, and the first identifier information is used to identify a unicast connection. The network device deletes, based on the first identifier information, a configuration corresponding to the unicast connection. The network device sends third indication information to the first terminal device, where the third indication information is used to indicate the first terminal device to release a configuration of an access stratum corresponding to the unicast connection, the third indication information is release indication information, and the release indication information is used by the first terminal device to release the configuration of the access stratum corresponding to the unicast connection. Therefore, after receiving the first identifier information, the network device may indicate the first terminal device to release the configuration of the access stratum.

In a possible implementation, the method further includes: The network device receives notification information from the first terminal device, where the notification information is used to notify the network device that the unicast connection of the access stratum of the first terminal device has been released, and the notification information includes an updated destination identifier list.

Herein, after receiving the notification information, the network device may no longer maintain a context configuration of the access stratum corresponding to the unicast connection, thereby saving resource space of the network device.

According to a third aspect, a connection release method is provided. The method includes: A second terminal device receives a first RRC message from a first terminal device, where the first RRC message is used to indicate the second terminal device to release a configuration of an access stratum corresponding to a unicast connection; the access stratum of the second terminal device releases, based on the first RRC message, the configuration of the access stratum corresponding to the unicast connection; and the second terminal device sends a second RRC message to the first terminal device, where the second RRC message is used to respond to the first RRC message. Therefore, after releasing the configuration of the access stratum, the second terminal device may notify the first terminal device, so that the access stratum of the first terminal device also performs corresponding release.

According to a fourth aspect, a connection release method is provided. The method includes: An upper layer of an access stratum of a second terminal device receives a release request message, where the release request message is used to indicate the second terminal device to release a unicast connection; the upper layer of the access stratum of the second terminal device generates a release acknowledgment message, where the release acknowledgment message is used to respond to the release request message; the upper layer of the access stratum of the second terminal device sends the release acknowledgment message and fifth indication information to the access stratum of the second terminal device, where the fifth indication information is used to indicate the access stratum of the second terminal device to release a configuration of the access stratum corresponding to the unicast connection; the access stratum of the second terminal device sends the release acknowledgment message to the first terminal device; and the access stratum of the second terminal device releases the configuration of the access stratum corresponding to the unicast connection.

Therefore, after receiving the release request message, the second terminal device releases a configuration of the upper layer of the unicast connection, and generates the release acknowledgment message and the fifth indication information. The access stratum of the second terminal device releases the configuration of the access stratum corresponding to the unicast connection only after sending the release acknowledgment message to the first terminal device.

According to a fifth aspect, a connection release method is provided. The method includes: A second terminal device receives a third RRC message from a first terminal device, where the third RRC message includes a release request message, and the third RRC message is used to indicate the second terminal device to release a configuration of an access stratum corresponding to a unicast connection. An access stratum of the second terminal device sends the release request message to an upper layer of the access stratum of the second terminal device. The upper layer of the access stratum of the second terminal device generates a release acknowledgment message, and sends the release acknowledgment message to the access stratum of the second terminal device. The access stratum of the second terminal device sends a fourth RRC message to the first terminal device, where the fourth RRC message indicates that the access stratum of the second terminal device has successfully released the configuration of the access stratum corresponding to the unicast connection, the fourth RRC message includes the release acknowledgment message, and the release acknowledgment message is used to indicate that the upper layer of the access stratum of the second terminal device has successfully released the unicast connection.

Therefore, the second terminal device sends the fourth RRC message to the first terminal device, so that the access stratum of the first terminal device releases the access stratum.

According to a sixth aspect, a connection release method is provided. The method includes: An access stratum of a terminal device sends fourth indication information to an upper layer of the access stratum of the terminal device, where the fourth indication information is used to indicate the upper layer of the access stratum of the terminal device to detect a unicast connection; and the upper layer of the access stratum of the terminal device detects the unicast connection based on the fourth indication information. Therefore, the access stratum of the first terminal device may actively indicate the upper layer to detect the unicast connection, that is, a detection manner is relatively flexible.

In a possible implementation, that an access stratum of a terminal device sends detection indication information to an upper layer of the terminal device includes: The terminal device sends the detection indication information to the upper layer of the first terminal device based on preset time.

Therefore, the access stratum of the terminal device may indicate, based on the preset time, the upper layer of the access stratum of the terminal device to detect the unicast connection.

Optionally, the preset time is implemented by using a timer.

Optionally, the fourth indication information includes identifier information of the unicast connection.

Optionally, the fourth indication information is used to indicate the upper layer of the access stratum of the first terminal device to initiate a keep-alive procedure for the unicast connection.

Optionally, a message of the keep-alive procedure is carried on a signaling bearer of the access stratum of the terminal device.

In a possible implementation, the method further includes: The first terminal device sends a detection message to a second terminal device; and if the first terminal device receives no acknowledgment message from the second terminal device after a timer expires, the first terminal device determines that the unicast connection does not exist, where the acknowledgment message is used to respond to the detection message.

According to a seventh aspect, a communication apparatus is provided. The communication apparatus includes a module configured to perform the method according to any one of the first aspect or the possible implementations of the first aspect; or includes a module configured to perform the method according to any one of the sixth aspect or the possible implementations of the sixth aspect.

According to an eighth aspect, a communication apparatus is provided. The communication apparatus includes a module configured to perform the method according to any one of the second aspect or the possible implementations of the second aspect.

According to a ninth aspect, a communication apparatus is provided. The communication apparatus includes a module configured to perform the method according to any one of the third aspect or the possible implementations of the third aspect; or includes a module configured to perform the method according to any one of the fourth aspect or the possible implementations of the fourth aspect; or includes a module configured to perform the method according to any one of the fifth aspect or the possible implementations of the fifth aspect.

According to a tenth aspect, a communication apparatus is provided. The communication apparatus may be the terminal device in the foregoing method designs, or a chip disposed in the terminal device. The communication apparatus includes: a processor that is coupled to a memory, and may be configured to execute instructions in the memory, to implement the method performed by the first terminal device according to any one of the first aspect or the possible implementations of the first aspect; or to implement the method performed by the terminal device according to any one of the sixth aspect and the possible implementations of the sixth aspect. Optionally, the communication apparatus further includes the memory. Optionally, the communication apparatus further includes a communication interface. The processor is coupled to the communication interface.

When the communication apparatus is the terminal device, the communication interface may be a transceiver or an input/output interface.

When the communication apparatus is the chip disposed in the terminal device, the communication interface may be an input/output interface.

Optionally, the transceiver may be a transceiver circuit. Optionally, the input/output interface may be an input/output circuit.

According to an eleventh aspect, a communication apparatus is provided. The communication apparatus may be the network device in the foregoing method designs, or a chip disposed in the network device. The communication apparatus includes a processor that is coupled to a memory, and may be configured to execute instructions in the memory, to implement the method performed by the network device according to any one of the second aspect and the possible implementations of the second aspect. Optionally, the communication apparatus further includes the memory. Optionally, the communication apparatus further includes a communication interface. The processor is coupled to the communication interface.

When the communication apparatus is the network device, the communication interface may be a transceiver or an input/output interface.

When the communication apparatus is the chip disposed in the network device, the communication interface may be an input/output interface.

Optionally, the transceiver may be a transceiver circuit. Optionally, the input/output interface may be an input/output circuit.

According to a twelfth aspect, a communication apparatus is provided. The communication apparatus may be the terminal device in the foregoing method designs, or a chip disposed in the terminal device. The communication apparatus includes: a processor that is coupled to a memory, and may be configured to execute instructions in the memory, to implement the method performed by the second terminal device according to any one of the third aspect and the possible implementations of the third aspect; or to implement the method performed by the second terminal device according to any one of the fourth aspect and the possible implementations of the fourth aspect; or to implement the method performed by the second terminal device according to any one of the fifth aspect and the possible implementations of the fifth aspect. Optionally, the communication apparatus further includes the memory. Optionally, the communication apparatus further includes a communication interface. The processor is coupled to the communication interface.

When the communication apparatus is the terminal device, the communication interface may be a transceiver or an input/output interface.

When the communication apparatus is the chip disposed in the terminal device, the communication interface may be an input/output interface.

Optionally, the transceiver may be a transceiver circuit. Optionally, the input/output interface may be an input/output circuit.

According to a thirteenth aspect, a program is provided. When being executed by a processor, the program is configured to perform any method according to the first aspect and the possible implementations of the first aspect, or is configured to perform any method according to the second aspect and the possible implementations of the second aspect; or is configured to perform any method according to the third aspect, the fourth aspect, or the fifth aspect and the possible implementations of the third aspect, the fourth aspect, or the fifth aspect; or is configured to perform any method according to the sixth aspect and the possible implementations of the sixth aspect.

According to a fourteenth aspect, a program product is provided. The program product includes program code. When the program code is run by a communication unit and a processing unit or a transceiver and a processor of a communication apparatus (for example, a terminal device), the communication apparatus is enabled to perform any method according to the first aspect and the possible implementations of the first aspect; or the communication apparatus is enabled to perform any method according to the second aspect and the possible implementations of the second aspect; or the communication apparatus is enabled to perform any method according to the third aspect, the fourth aspect, or the fifth aspect and the possible implementations of the third aspect, the fourth aspect, or the fifth aspect; or the communication apparatus is enabled to perform any method according to the sixth aspect and the possible implementations of the sixth aspect.

According to a fifteenth aspect, a computer-readable storage medium is provided. The computer-readable storage medium stores a program. When the program is executed, a communication apparatus (for example, a terminal device) is enabled to perform any method according to the first aspect and the possible implementations of the first aspect; or a communication apparatus (for example, a terminal device) is enabled to perform any method according to the third aspect and the possible implementation of the third aspect; or a communication apparatus (for example, a terminal device) is enabled to perform any method according to the fourth aspect and the possible implementation of the fourth aspect; or a communication apparatus (for example, a terminal device) is enabled to perform any method according to the fifth aspect and the possible implementations of the fifth aspect; or a communication apparatus (for example, a terminal device) is enabled to perform any method according to the sixth aspect and the possible implementations of the sixth aspect.

According to a sixteenth aspect, a computer-readable storage medium is provided. The computer-readable storage medium stores a program. When the program is executed, a communication apparatus (for example, a network device) is enabled to perform any method according to the second aspect and the possible implementations of the second aspect.

According to a seventeenth aspect, a communication system is provided. The system includes a first terminal device, a second terminal device, and a network device, where the first terminal device is configured to perform any method according to the first aspect and the possible implementations of the first aspect, the network device is configured to perform any method according to the second aspect and the possible implementations of the second aspect; and the second terminal device is configured to perform any method according to the third aspect, the fourth aspect, or the fifth aspect and the possible implementations of the third aspect, the fourth aspect, or the fifth aspect; or the first terminal device is configured to perform any method according to the sixth aspect and the possible implementations of the sixth aspect.

Optionally, the communication system may further include another device that interacts or communicates with one or more of the first terminal device, the second terminal device, and the network device.

DETAILED DESCRIPTION OF ILLUSTRATIVE EMBODIMENTS

Figure 1:
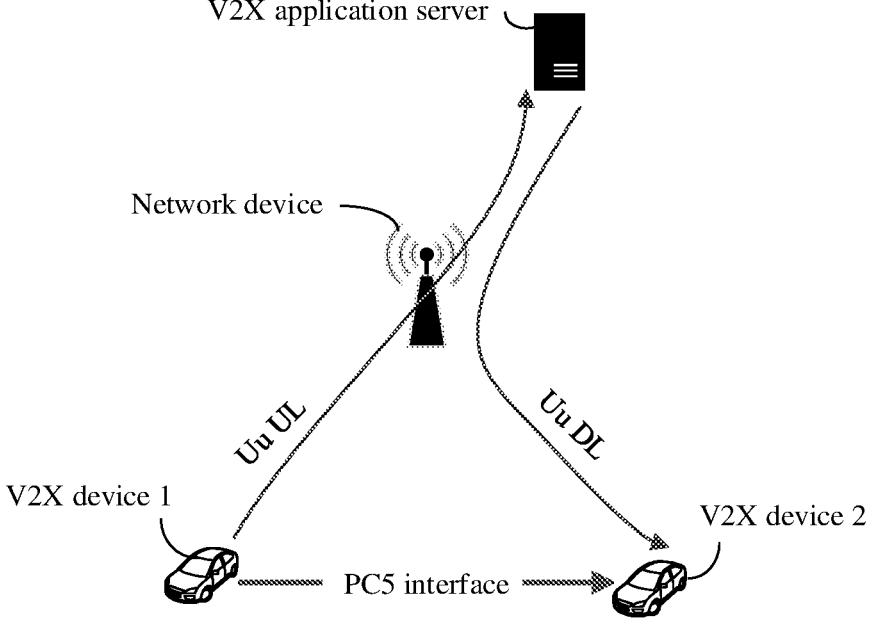
FIG. 1 is an example diagram of a system architecture to which an embodiment of this application is applied.

The following describes technical solutions of this application with reference to the accompanying drawings.

In descriptions of the embodiments of this application, unless otherwise stated, "a plurality of" or "multiple" means two or more than two.

The technical solutions in the embodiments of this application may be applied to various communication systems, for example, a global system for mobile communications (GSM), a code division multiple access (CDMA) system, a wideband code division multiple access (WCDMA) system, a general packet radio service (GPRS) system, a long term evolution (LTE) system, an LTE frequency division duplex (FDD) system, an LTE time division duplex (TDD) system, a universal mobile telecommunications system (UMTS), a worldwide interoperability for microwave access (WiMAX) communication system, a future 5th generation (5G) system or a new radio (NR) system, a vehicle-to-everything (V2X) system, and a device-to-device (D2D) system. Optionally, the V2X system may be specifically any one of the following systems: vehicle-to-network (V2N), vehicle-to-vehicle (V2V) communication, vehicle-to-pedestrian (V2P) communication, vehicle-to-infrastructure (V2I) communication, and the like.

One participant of the V2N is a terminal device, and the other participant is a service entity. The V2N is currently the most widely used form of an internet of vehicles, and a main function of the V2N is to enable a vehicle to connect to a cloud server through a mobile network, to provide functions such as navigation, entertainment, and anti-theft through the cloud server.

Two participants of the V2V are terminal devices. The V2V may be used for information exchange and reminding between vehicles, and a most typical application is an anti-collision safety system between vehicles.

Two participants of the V2P are terminal devices. The V2P may be used for safety warning for a pedestrian or a non-motor vehicle on a road.

One participant of the V2I is a terminal device, and the other participant an infrastructure (or a road facility). The V2I may be used for communication between a vehicle and an infrastructure. For example, the infrastructure may be a road, a traffic light, or a roadblock. The terminal device may obtain road management information such as a traffic light signal time sequence.

A terminal device in the embodiments of this application may be user equipment (UE), a subscriber station (SS), customer-premises equipment (CPE), an access terminal, a subscriber unit, a subscriber station, a mobile station, a remote station, a remote terminal, a mobile device, a user terminal, a terminal, a wireless communication device, a user agent, or a user apparatus. The terminal device may alternatively be a cellular phone, a cordless phone, a session initiation protocol (SIP) phone, a wireless local loop (WLL) station, a personal digital assistant (PDA), a handheld device or a computing device having a wireless communication function, another processing device connected to a wireless modem, a vehicle-mounted device, a wearable device, a terminal device in a future 5G network, or a terminal device in a future evolved public land mobile network (PLMN). This is not limited in the embodiments of this application. The terminal device may alternatively be a software and/or hardware module deployed in an autonomous vehicle, a smart vehicle, a digital vehicle, or a vehicle in a vehicle network. The terminal device in the embodiments of this application may be a D2D device, a V2X device, or a road side unit (RSU).

A network device in the embodiments of this application may be a device configured to communicate with a terminal device. The network device may be a base transceiver station (BTS) in a global system for mobile communications (GSM) system or a code division multiple access (CDMA) system, or may be a NodeB (NB) in a wideband code division multiple access (WCDMA) system, or may be an evolved NodeB (eNB or eNodeB) in an LTE system, or may be a radio controller in a cloud radio access network (CRAN) scenario. Alternatively, the network device may be a relay station, an access point, a vehicle-mounted device, a wearable device, a network device (gNB) in a future 5G network, a network device in a future evolved PLMN, or the like. This is not limited in the embodiments of this application.

In the embodiments of this application, the terminal device or the network device includes a hardware layer, an operating system layer running above the hardware layer, and an application layer running above the operating system layer. The hardware layer includes hardware such as a central processing unit (CPU), a memory management unit (MMU), and a memory (also referred to as a main memory). The operating system may be any one or more computer operating systems that implement service processing through a process, for example, a Linux operating system, a Unix operating system, an Android operating system, an iOS operating system, or a Windows operating system. The application layer includes applications such as a browser, an address book, word processing software, and instant messaging software. In addition, a specific structure of an entity for executing a method provided in the embodiments of this application is not specifically limited in the embodiments of this application, provided that a program that records code for the method provided in the embodiments of this application can be run to perform communication according to the method provided in the embodiments of this application. For example, the entity for executing the method provided in the embodiments of this application may be the terminal device, the network device, or a functional module that is in the terminal device or the network device and that can invoke and execute the program.

In addition, aspects or features of this application may be implemented as a method, an apparatus, or a product that uses standard programming and/or engineering technologies. The term "product" used in this application covers a computer program that can be accessed from any computer-readable component, carrier, or medium. For example, the computer-readable medium may include but is not limited to a magnetic storage component (for example, a hard disk, a floppy disk, or a magnetic tape), an optical disc (for example, a compact disc (CD) or a digital versatile disc (DVD)), and a smart card and a flash memory component (for example, an erasable programmable read-only memory (EPROM), a card, a stick, or a key drive). In addition, various storage media described in this specification may represent one or more devices and/or other machine-readable media that are configured to store information. The term "machine-readable medium" may include but is not limited to a radio channel, and various other media that can store, contain, and/or carry instructions and/or data.

FIG. 1 is an example diagram of a system architecture to which an embodiment of this application is applied. As shown in FIG. 1, a communication system includes a V2X application server, V2X devices (including a V2X device 1 and a V2X device 2), and a network device. The V2X devices communicate with each other through a PC5 interface. A direct communication link between the V2X devices may be referred to as a sidelink (SL). Communication between the V2X device and the V2X application server requires forwarding by the network device. Specifically, for an uplink, a transmit end V2X device sends V2X data to the network device through a Uu interface, the network device sends the data to the V2X application server for processing, and then the V2X application server delivers the data to a receive end V2X device. For a downlink, the V2X application server sends V2X data to the network device, and the network device sends the V2X data to the V2X device through a Uu interface.

It should be understood that the V2X device in FIG. 1 is an internet of things device, for example, UE.

It should be further understood that an arrow direction in FIG. 1 is merely described by using the V2X device 1 as an example, and constitutes no limitation on this embodiment of this application. Actually, communication between the V2X device 1 and the V2X device 2 may be bidirectional, and the V2X device 2 may also perform uplink communication with the network device. This is not specifically limited.

Currently, all unicast connection detection mechanisms are performed at a V2X layer, and there is no access stratum connection maintenance procedure. The following describes a connection release method in the embodiments of this application with reference to FIG. 2 to FIG. 4.

Figure 2:
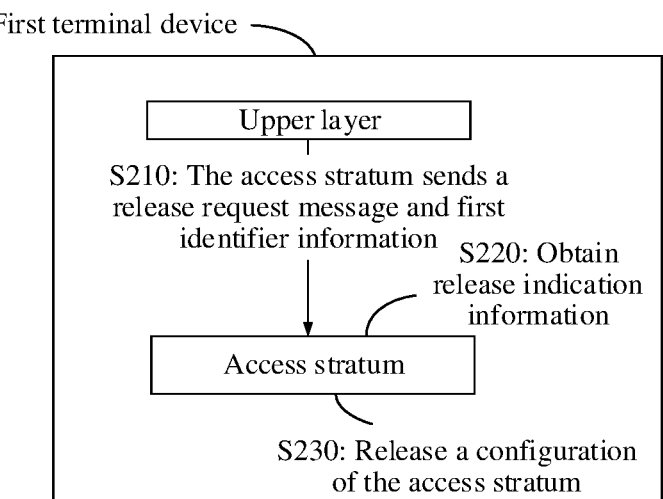
FIG. 2 is a schematic flowchart of a connection release method according to an embodiment of this application.

FIG. 2 is a schematic flowchart of a connection release method 200 according to an embodiment of this application. It should be understood that, in the method 200, behavior on a first terminal device side may be controlled or performed by a first terminal device or a module (for example, a chip) in the first terminal device. As shown in FIG. 2, the method 200 includes the following steps.

S210: An upper layer of an access stratum of the first terminal device sends a release request message and first identifier information to the access stratum of the first terminal device, where the release request message is used to request a second terminal device to release a unicast connection, the first identifier information is used to identify the unicast connection, the unicast connection is a unicast connection on a sidelink, and the sidelink is a wireless transmission link between the first terminal device and the second terminal device.

The access (AS) stratum includes one or more of the following: a service data adaptation protocol layer, a radio resource control layer, a sidelink radio resource control layer, a media access control layer, and a physical layer. An upper layer of an access stratum of a terminal device may be referred to as a non-access stratum. The non-access stratum includes an application (APP) layer or a vehicle-to-everything (V2X) layer. It should be understood that descriptions of the access stratum and the non-access stratum are applicable to the first terminal device or the second terminal device.

The release request message may be a PC5-S connection release message. For example, the release request message may be V2X layer signaling, for example, PC5-S signaling, or may be an inter-layer source language.

The first identifier information may be generated or allocated by the first terminal device. The first identifier information may be an ID of the unicast connection, and is used to identify the unicast connection. For example, the first identifier information may be an identifier allocated by a V2X layer to the unicast connection.

The first terminal device and the second terminal device may be mutually transmit and receive ends. For example, the first terminal device is a transmit end, and the second terminal device is a receive end. For another example, the first terminal device is a receive end, and the first terminal device is a transmit end.

Optionally, before S210, the method further includes: The upper layer of the first terminal device determines to release the unicast connection. Specifically, when finding that the unicast connection is unavailable, the upper layer of the first terminal device may determine to release the unicast connection; or after service data of the unicast connection is transmitted, the upper layer of the first terminal device may determine to release the unicast connection. After determining to release the unicast connection, the upper layer of the access stratum of the first terminal device may perform S210. Certainly, this does not constitute a limitation on this embodiment of this application.

"The unicast connection is unavailable" may be understood as that the unicast connection is deleted, the unicast connection does not exist, communication quality of the unicast connection is poor, or the like.

Herein, a manner in which the first terminal device determines whether the unicast connection is unavailable is not specifically limited in this embodiment of this application. For example, a keep-alive mechanism may be used; or another embodiment provided in this application, that is, a method 300 (which is described in detail below), may be used; or another manner may be used.

S220: The access stratum of the first terminal device obtains release indication information.

The access stratum of the first terminal device may obtain the release indication information in a plurality of manners. For example, the access stratum of the first terminal device generates the release indication information, or obtains the release indication information from a network device, or obtains the release indication information from the second terminal device, or obtains the release indication information from the upper layer of the first terminal device.

S230: The access stratum of the first terminal device releases, based on the release indication information and the first identifier information, a configuration of the access stratum corresponding to the unicast connection.

The first identifier information may include a source identifier (for example, a source ID) and/or a destination identifier (for example, a destination ID). The source identifier may be an identifier allocated by the first terminal device to the unicast connection. The destination identifier may be an identifier allocated by the second terminal device to the unicast connection. The unicast connection is set up between the first terminal device and the second terminal device.

After obtaining the release indication information, the access stratum of the first terminal device searches for the corresponding unicast connection based on the first identifier information, and then releases a context or the configuration of the access stratum corresponding to the unicast connection. Specifically, the access stratum of the first terminal device may release one or more of the following content: a user plane bearer corresponding to the unicast connection, a signaling plane bearer corresponding to the unicast connection, a measurement configuration corresponding to the unicast connection, a resource pool corresponding to the unicast connection, or a sidelink radio bearer corresponding to the unicast connection. The sidelink is a wireless direct communication link between the first terminal device and the second terminal device.

In this embodiment of this application, the upper layer of the access stratum of the first terminal device sends the release request message and the first identifier information to the access stratum of the first terminal device, to trigger the access stratum of the first terminal device to obtain the release indication information, then searches for the corresponding unicast connection based on the first identifier information, and finally release, based on the release indication information, the configuration of the access stratum corresponding to the unicast connection, to release the access stratum, and help avoid or minimize a waste of resources.

The following separately describes various manners in which the access stratum of the first terminal device obtains the release indication information in this embodiment of this application.

Manner 1

Optionally, that the access stratum of the first terminal device obtains release indication information includes: The upper layer of the first terminal device sends first indication information to the access stratum of the first terminal device, where the first indication information is used to indicate that the release request message is a unicast connection release request message, and the first indication information is the release indication information.

The purpose of adding the first indication information herein is that the access stratum of the first terminal device may not identify content of the release request message sent by the upper layer of the access stratum of the first terminal device. Therefore, one piece of indication information needs to explicitly inform the access stratum of the first terminal device that the release request message is the unicast connection release request message. After obtaining the first indication information, the upper layer of the first terminal device may consider that the release indication information is obtained, so that the configuration of the access stratum corresponding to the unicast connection is released based on the release indication information.

That is, in the manner 1, the release indication information obtained by the access stratum of the first terminal device is from the upper layer of the access stratum of the first terminal device.

Manner 2

Optionally, that the access stratum of the first terminal device obtains release indication information includes the following.

The access stratum of the first terminal device receives a release acknowledgment message from an access stratum of the second terminal device, where the release acknowledgment message is used to respond to the release request message, and the release acknowledgment message is the release indication information.

Optionally, before the access stratum of the first terminal device receives the release acknowledgment message from the access stratum of the second terminal device, the access stratum of the first terminal device may send the release request message to the access stratum of the second terminal device.

Optionally, the release acknowledgment message indicates that the upper layer of the second terminal device has released the unicast connection, or indicates that the access stratum of the second terminal device has released a context or a configuration related to the unicast connection. For example, the release acknowledgment message may be PC5-S signaling.

For example, the first terminal device may transmit the PC5-S signaling through a specific logical channel, so that the access stratum of the second terminal device can identify the PC5-S signaling by using a logical channel (LCH) identifier ID.

For example, if the access stratum of the first terminal device receives the release acknowledgment message from the access stratum of the second terminal device, the access stratum of the first terminal device may learn that the access stratum of the second terminal device has performed a corresponding release operation based on the release request message, and then understand the release acknowledgment message as the release indication information, to release, based on the release indication information, the configuration of the access stratum corresponding to the unicast connection.

That is, in the manner 2, the release indication information obtained by the access stratum of the first terminal device is from the access stratum of the second terminal device.

Manner 3

Optionally, the method 200 further includes: The upper layer of the access stratum of the first terminal device sends first indication information to the access stratum of the first terminal device, where the first indication information is used to indicate that the release request message is a unicast connection release request message, and the first terminal device sends a first RRC message to the second terminal device, where the first RRC message is used to indicate the second terminal device to release a configuration of an access stratum corresponding to the unicast connection. Correspondingly, the second terminal device receives the first RRC message. The second terminal device may release, based on the first RRC message, the configuration of the access stratum corresponding to the unicast connection. The second terminal device sends a second RRC message to the first terminal device, where the second RRC message is used to respond to the first RRC message.

Correspondingly, that the access stratum of the first terminal device obtains release indication information includes: The first terminal device receives the second RRC message from the second terminal device, where the second RRC message is used to respond to the first RRC message. After the first terminal device receives the second RRC message from the second terminal device, it indicates that the connection between the first terminal device and the second terminal device has been released.

Specifically, after receiving the second RRC message sent by the second terminal device, the first terminal device releases a context or the configuration of the access stratum corresponding to the unicast connection. In this case, the second RRC message is the release indication information.

Optionally, the network device may indicate the first terminal device to send the first RRC message to the second terminal device. Specifically, after receiving the first indication information from the upper layer of the access stratum of the first terminal device, the access stratum of the first terminal device further reports the first indication information to the network device, and the network device indicates the first terminal device to send the first indication information to the second terminal device. Alternatively, the first RRC message may be sent by the access stratum of the first terminal device to the second terminal device after the access stratum of the first terminal device receives the first indication information from the upper layer of the access stratum of the first terminal device. This is not specifically limited.

Herein, the access stratum of the first terminal device may not identify content of the release request message sent by the upper layer of the access stratum of the first terminal device. Therefore, one piece of indication information needs to explicitly inform the access stratum of the first terminal device that the release request message is the unicast connection release request message.

The upper layer of the access stratum of the first terminal device sends the first indication information to the access stratum of the first terminal device. In this way, after learning that the release request message is the unicast connection release request message, the access stratum of the first terminal device may notify, by using the first RRC message, the second terminal device to release the configuration of the access stratum of the unicast connection. The second terminal device may send the second RRC message to the first terminal device, namely, an acknowledgment message in response to the first RRC message. The second RRC message may indicate that the second terminal device has released the configuration of the access stratum of the unicast connection. The access stratum of the first terminal device may understand the second RRC message as the release indication information, to release, based on the release indication information, the configuration of the access stratum corresponding to the unicast connection.

Alternatively, optionally, after the first terminal device sends the first RRC message to the second terminal device, the access stratum of the first terminal device determines the release indication information.

For example, the first terminal device sends the first RRC message to the second terminal device. If the first terminal device receives no release acknowledgment response, namely, a response used to respond to the first RRC message, from the second terminal device after a specific time period expires, the access stratum of the first terminal device determines to perform the release. That is, the access stratum of the first terminal device determines the release indication information, to release, based on the release indication information, the configuration of the access stratum corresponding to the unicast connection.

For another example, the first RRC message may fail to be sent, and the first terminal device sends the first RRC message to the second terminal device for a plurality of times. For example, if the first terminal device does not receive the second RRC message from the second terminal device after a specific time period expires, the first terminal device retransmits the first RRC message. When a maximum quantity of retransmission times has been reached but the first RRC message has not been successfully retransmitted, the access stratum of the first terminal device determines to perform the release. That is, the access stratum of the first terminal device determines the release indication information, to release, based on the release indication information, the configuration of the access stratum corresponding to the unicast connection.

Therefore, in the manner 3, the release indication information obtained by the access stratum of the first terminal device is determined based on the second RRC message from the second terminal device.

Manner 4

Optionally, the method 200 further includes: The access stratum of the first terminal device sends the release request message to an access stratum of the second terminal device, and the upper layer of the access stratum of the first terminal device releases the unicast connection of the upper layer of the access stratum of the first terminal device. Correspondingly, that the access stratum of the first terminal device obtains release indication information includes: The upper layer of the access stratum of the first terminal device sends second indication information to the access stratum of the first terminal device, where the second indication information is used to notify the access stratum of the first terminal device that the upper layer of the first terminal device has released the unicast connection, and the second indication information is the release indication information.

For the second terminal device, after receiving the release request message, an upper layer of the access stratum of the second terminal device determines to accept the release request. The upper layer of the access stratum of the second terminal device generates a release acknowledgment message, where the release acknowledgment message is used to respond to the release request message. The upper layer of the access stratum of the second terminal device sends the release acknowledgment message and fifth indication information to the access stratum of the second terminal device, where the fifth indication information is used to indicate the access stratum of the second terminal device to release a configuration of the access stratum corresponding to the unicast connection. The access stratum of the second terminal device sends the release acknowledgment message to the first terminal device. The access stratum of the second terminal device releases the configuration of the access stratum corresponding to the unicast connection. Optionally, the fifth indication information may also be understood as being used to indicate that the upper layer has acknowledged release of the unicast connection, or understood as being used to indicate that the message is the release acknowledgment message.

In other words, after receiving the release request message of the first terminal device, the upper layer of the access stratum of the second terminal device may generate the release acknowledgment message, and then deliver the release acknowledgment message to the access stratum, and additionally add an indication to indicate the access stratum of the second terminal device to release a context/the configuration. After sending the release acknowledgment message to the first terminal device, the access stratum of the second terminal device releases the context/configuration of the access stratum that is of the second terminal device and that is related to the unicast connection.

Optionally, the upper layer of the access stratum of the first terminal device may determine to release the unicast connection of the upper layer of the access stratum of the first terminal device; or after receiving the release acknowledgment message, the upper layer of the access stratum of the first terminal device may release the unicast connection of the upper layer of the access stratum of the first terminal device. Specifically, after sending the release request message to the second terminal device, the first terminal device receives the release acknowledgment message from the second terminal device, where the release acknowledgment message is used to respond to the release request message. After receiving the release acknowledgment message, the access stratum of the first terminal device cannot identify content of the release acknowledgment message, and delivers the release acknowledgment message to the upper layer of the access stratum of the first terminal device.

The upper layer of the access stratum of the first terminal device sends second indication information to the access stratum of the first terminal device after releasing the unicast connection of the upper layer of the access stratum of the first terminal device, where the second indication information is used to notify the access stratum of the first terminal device that the upper layer of the first terminal device has released the unicast connection. The access stratum of the first terminal device may understand the second indication information as the release indication information, to release, based on the release indication information, a context/the configuration of the access stratum corresponding to the unicast connection. Alternatively, optionally, the second indication information is used to indicate the access stratum of the first terminal device to release the configuration of the access stratum corresponding to the unicast connection. The access stratum of the first terminal device may understand the second indication information as the release indication information, to release, based on the release indication information, the context/configuration of the access stratum corresponding to the unicast connection.

Alternatively, after obtaining the second indication information, the first terminal device determines whether to release the configuration of the access stratum corresponding to the unicast connection, that is, determines the release indication information.

Therefore, in the manner 4, the release indication information obtained by the access stratum of the first terminal device is determined based on the second indication information sent by the upper layer of the access stratum of the first terminal device.

Manner 5

Optionally, that the access stratum of the first terminal device obtains release indication information includes: The first terminal device receives third indication information from the network device, where the third indication information is used to indicate the first terminal device to release a context/the configuration of the access stratum corresponding to the unicast connection, and the third indication information is the release indication information.

Optionally, the method 200 further includes: The first terminal device sends first signaling to the network device, where the first signaling includes the first identifier information. Correspondingly, the network device receives the first signaling. Optionally, the first signaling may be an RRC message sent by the first terminal device to the network device, for example, a sidelink UE notification message (sidelink UE information). Correspondingly, the network device receives the first signaling.

The first terminal device does not directly release the configuration of the access stratum corresponding to the unicast connection, but includes identifier information of the unicast connection, namely, the first identifier information, in the first signaling, and sends the first signaling to the network device, to request the network device to trigger release of a configuration of an access stratum of the network device corresponding to the unicast connection. After receiving the first signaling, the network device may generate the third indication information, and send the third indication information to the first terminal device, to indicate the first terminal device to release the configuration of the access stratum corresponding to the unicast connection. The access stratum of the first terminal device may understand the third indication information as the release indication information, to release, based on the release indication information, the context/configuration of the access stratum corresponding to the unicast connection.

Correspondingly, the network device releases or deletes, based on the first signaling, the configuration of the access stratum corresponding to the unicast connection, and sends the third indication information to the first terminal device, where the third indication information is used to indicate the first terminal device to release the configuration of the access stratum corresponding to the unicast connection.

Herein, the purpose of sending the first signaling to the network device is that the network device maintains a context or the configuration of the access stratum corresponding to the unicast connection. If the network device indicates the first terminal device to release the configuration of the access stratum corresponding to the unicast connection, the network device also cancels or deletes the maintained context or configuration of the access stratum corresponding to the unicast connection, or releases the context or configuration of the access stratum corresponding to the unicast connection. This can avoid or minimize unnecessary resource space occupation or waste, and helps save resource space of the network device.

That is, in the manner 5, the release indication information obtained by the access stratum of the first terminal device is from the network device.

The case described above corresponds to a case in which the first terminal device releases the configuration of the access stratum based on the third indication information. Herein, there is another case: The first terminal device may release the configuration of the access stratum. In this case, it is not necessary for the network device to receive the first signaling from the first terminal device.

Specifically, the first terminal device sends notification information to the network device, where the notification information indicates that the first terminal device has released the configuration of the access stratum corresponding to the unicast connection in another manner (for example, the first terminal device determines and releases the configuration of the access stratum corresponding to the unicast connection). Correspondingly, after receiving the notification information, the network device may delete the configuration corresponding to the unicast connection.

Manner 6

Optionally, the method 200 further includes: The first terminal device sends a third RRC message to the second terminal device, where the third RRC message is used to indicate the second terminal device to release a configuration of an access stratum of the unicast connection, and the third RRC message may further include the release request message. Correspondingly, the second terminal device receives the third RRC message. The third RRC message includes the first identifier information, or the third RRC message is sent by using the first identifier information.

"The third RRC message is sent by using the first identifier information may be understood as that when sending the third RRC message to the second terminal device, the first terminal device includes the first identifier information in a MAC header. For example, the MAC header includes a source identifier (for example, a source ID) and/or a destination identifier (for example, a destination ID). Alternatively, in an optional implementation, the MAC header carries only the source identifier and a part of the destination identifier, and the other part of the destination identifier is carried at a physical layer. Alternatively, in an optional implementation, the MAC header carries only a part of the source identifier and a part of the destination identifier, and the other part of the source identifier and the other part of the destination identifier are carried at a physical layer. The first identifier information is used to indicate, to the second terminal device, that the third RRC message corresponds to the unicast connection.

After the second terminal device obtains the third RRC message, the access stratum of the second terminal device sends the release request message in the third RRC message to an upper layer of the access stratum of the second terminal device. Then, the upper layer of the access stratum of the second terminal device generates a release acknowledgment message, and sends the release acknowledgment message to the access stratum of the second terminal device. Then, the second terminal device releases the configuration of the access stratum corresponding to the unicast connection, and the access stratum of the second terminal device sends a fourth RRC message to the first terminal device, where the fourth RRC message indicates that the access stratum of the second terminal device has successfully released the configuration of the access stratum corresponding to the unicast connection. Optionally, after sending the fourth RRC message, the access stratum of the second terminal device may release the configuration of the access stratum corresponding to the unicast connection.

The fourth RRC message may further include the release acknowledgment message, and the release acknowledgment message is used to indicate the first terminal device that the upper layer of the access stratum of the second terminal device has successfully released the unicast connection.

Optionally, that the access stratum of the first terminal device obtains release indication information includes: The first terminal device receives the fourth RRC message from the second terminal device, where the fourth RRC message indicates that the access stratum of the second terminal device has successfully released the configuration of the access stratum corresponding to the unicast connection, the fourth RRC message includes the release acknowledgment message, the release acknowledgment message is used to indicate that the upper layer of the access stratum of the second terminal device has successfully released the unicast connection, and the fourth RRC message is the release indication information; and the access stratum of the first terminal device delivers the release acknowledgment message in the fourth RRC message to the upper layer of the access stratum of the first terminal device.

Herein, a difference between this manner and the manner 3 lies in that the first RRC message in the manner 3 does not include the release request message, and is only used to release a connection of the access stratum of the unicast connection. The third RRC message sent herein has two functions: One function is the release request message included in the third RRC message, that is, the third RRC message is used to transmit the release request message, and the release request message is used to request the upper layer of the access stratum of the second terminal device to release the unicast connection. The other function is that the third RRC message is used to indicate the second terminal device to release the connection of the access stratum of the unicast connection. The second terminal device sends the fourth RRC message to the first terminal device, where the fourth RRC message also has two functions: One function is a release acknowledgment message included in the fourth RRC message, that is, the fourth RRC message is used to transmit the release acknowledgment message, and the release acknowledgment message indicates that the upper layer of the access stratum of the second terminal device has successfully released the unicast connection. The other function is that the fourth RRC message is used to indicate that the second terminal device has successfully released the connection of the access stratum of the unicast connection. The access stratum of the first terminal device may deliver the release acknowledgment message in the fourth RRC message to the upper layer of the access stratum of the first terminal device, so that the upper layer of the access stratum of the first terminal device releases the unicast connection. The access stratum of the first terminal device may understand the fourth RRC message as the release indication information, to release, based on the release indication information, the configuration of the access stratum corresponding to the unicast connection.

Alternatively, optionally, after the first terminal device sends the third RRC message to the second terminal device, the access stratum of the first terminal device determines the release indication information.

For example, the first terminal device sends the third RRC message to the second terminal device. If the first terminal device does not receive the fourth RRC message, namely, a response message used to respond to the third RRC message, from the second terminal device after a specific time period expires, the access stratum of the first terminal device determines to perform the release. That is, the access stratum of the first terminal device determines the release indication information, to release, based on the release indication information, the configuration of the access stratum corresponding to the unicast connection.

For another example, the third RRC message may fail to be sent, and the first terminal device sends the third RRC message to the second terminal device for a plurality of times. For example, if the first terminal device does not receive the fourth RRC message from the second terminal device after a specific time period expires, the first terminal device retransmits the third RRC message. When a maximum quantity of retransmission times has been reached but the third RRC message has not been successfully retransmitted, the access stratum of the first terminal device determines to perform the release. That is, the access stratum of the first terminal device determines the release indication information, to release, based on the release indication information, the configuration of the access stratum corresponding to the unicast connection.

For the second terminal device, after receiving the third RRC message, the access stratum of the second terminal device may deliver the release request message in the third RRC message to the upper layer of the access stratum of the second terminal device. Optionally, the access stratum of the second terminal device may further deliver identifier information (for example, second identifier information) of the unicast connection to the upper layer of the access stratum of the second terminal device. The second identifier information may be generated by the second terminal device for the unicast connection.

The second identifier information may include a source identifier (for example, a source ID) and a destination identifier (for example, a destination ID). It should be noted that, for the second terminal device, meanings of the IDs included in the second identifier information are different from the IDs included in the first identifier information on a first terminal device side. For example, on the first terminal device side, an ID allocated by the first terminal device to the unicast connection is the source ID, and an ID allocated by the second terminal device to the unicast connection is the destination ID. On the contrary, on a second terminal device side, an ID allocated by the first terminal device to the unicast connection is the destination ID, and an ID allocated by the second terminal device to the unicast connection is the source ID.

Optionally, before sending the third RRC message to the second terminal device, the first terminal device may report related release information of the unicast connection to the network device.

Optionally, the network device may indicate the first terminal device to send the third RRC message to the second terminal device. Specifically, after receiving the first indication information from the upper layer of the access stratum of the first terminal device, the access stratum of the first terminal device requests the network device to send the third RRC message to the second terminal device, and the network device indicates the first terminal device to send the third RRC message to the second terminal device. Alternatively, the first RRC message may be sent by the access stratum of the first terminal device to the second terminal device after the access stratum of the first terminal device receives the first indication information from the upper layer of the access stratum of the first terminal device. This is not specifically limited.

In the foregoing various implementations, after releasing the configuration of the access stratum corresponding to the unicast connection, the access stratum of the first terminal device may notify the network device. Optionally, the method 200 further includes:

The first terminal device sends notification information to the network device, where the notification information is used to notify the network device that the unicast connection of the access stratum of the first terminal device has been released, and the notification information includes an updated destination identifier list.

The updated destination identifier list does not include a destination identifier corresponding to the deleted unicast connection, but includes a destination identifier corresponding to another unicast connection that is not deleted.

Optionally, the updated destination identifier list may further include multicast and broadcast identifiers. The multicast and broadcast identifiers are also referred to as destination identifiers, but their meanings are different from the meaning of the unicast destination identifier. Specifically, the multicast destination identifier is used to identify a group, and the broadcast destination identifier is used to identify a V2X service or a V2X service type.

Specifically, after deleting the unicast connection, the first terminal device may update the destination identifier list, delete the destination identifier corresponding to the deleted unicast connection, and notify the network device. In this way, the network device does not need to maintain an unnecessary context or configuration, thereby saving resource space of the network device.

This application provides another embodiment. An access stratum of a terminal device may actively indicate an upper layer of the access stratum of the terminal device to detect a unicast connection.

Figure 3:
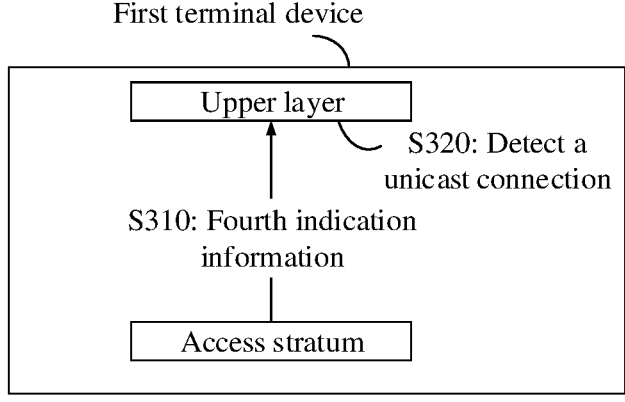
FIG. 3 is a schematic flowchart of a connection release method according to another embodiment of this application.

FIG. 3 is a schematic flowchart of a connection release method 300 according to another embodiment of this application. It should be understood that, in the method 300, behavior on a terminal device side may be performed by a first terminal device or a module (for example, a chip) in the first terminal device. As shown in FIG. 3, the method 300 includes the following steps.

S310: An access stratum of the first terminal device sends fourth indication information to an upper layer of the access stratum of the first terminal device, where the fourth indication information is used to indicate the upper layer of the access stratum of the first terminal device to detect a unicast connection.

Optionally, the fourth indication information may indicate the upper layer of the access stratum of the first terminal device to initiate keep-alive detection.

Optionally, the fourth indication information may include identifier information of the unicast connection, and the identifier information of the unicast connection may include a layer 2 identifier (L2 ID) allocated by the first terminal device to the unicast connection. The L2 ID may be a source ID used when the first terminal device sends data of the unicast connection. Alternatively, the L2 ID may be an L2 ID allocated by a second terminal device (namely, a peer device of the first terminal device) to the unicast connection, namely, a destination ID used when the first terminal device sends the data of unicast connection. Alternatively, the identifier information of the unicast connection includes a source ID and a destination ID. After receiving the fourth indication information, the upper layer of the access stratum of the first terminal device may determine, based on the identifier information that is of the unicast connection and that is included in the fourth indication information, a unicast connection for which a keep-alive procedure is to be initiated, generate a corresponding keep-alive message, and send the keep-alive message to the access stratum of the first terminal device for sending.

Optionally, an occasion at which the access stratum of the first terminal device sends the fourth indication information to the upper layer of the access stratum of the first terminal device may depend on the first terminal device.

Optionally, for the unicast connection, the access stratum of the first terminal device may send, at any moment, the fourth indication information to the upper layer of the access stratum of the first terminal device.

Optionally, the access stratum of the first terminal device may send the fourth indication information to the upper layer of the access stratum of the first terminal device based on preset time. The preset time may be absolute time or relative time. For example, the preset time may be a periodicity or a moment.

For example, the access stratum of the first terminal device may periodically send the fourth indication information to the upper layer of the access stratum of the first terminal device based on a preset periodicity.

For example, for the unicast connection, the access stratum of the first terminal device may send the fourth indication information to the upper layer of the access stratum of the first terminal device according to a set of rules. Specifically, for example, for a unicast connection, when data of the unicast connection is not received and/or sent within the preset time, the access stratum of the first terminal device may send the fourth indication information to the upper layer of the access stratum of the first terminal device. Duration T of the preset time may be determined by the first terminal device, may be preconfigured, or may be received from a network device. Optionally, the duration T of the preset time may be implemented by using a timer. Specifically, after receiving or sending the data of the unicast connection, the first terminal device needs to start the timer. Duration of the timer is T. If the first terminal device has not received or sent the data of the unicast connection before the timer expires, the access stratum of the first terminal device sends the fourth indication information to the upper layer of the access stratum of the first terminal device.

Optionally, the timer may be maintained at a packet data convergence layer protocol (PDCP) layer/radio link control (RLC) layer/media access control (MAC) layer. Corresponding data is a protocol data unit (PDU) or a service data unit (SDU) of a corresponding protocol layer.

S320: The upper layer of the access stratum of the first terminal device detects the unicast connection based on the fourth indication information.

Specifically, after obtaining the fourth indication information, the first terminal device sends a detection message to the second terminal device. The second terminal device returns an acknowledgment message to the first terminal device, where the acknowledgment message is used to respond to the detection message, and indicates that the unicast connection still exists. For example, if no acknowledgment message is received after the timer expires, the first terminal device considers that the unicast connection does not exist. If the unicast connection does not exist, the first terminal device may perform the foregoing method 200.

Figure 4:
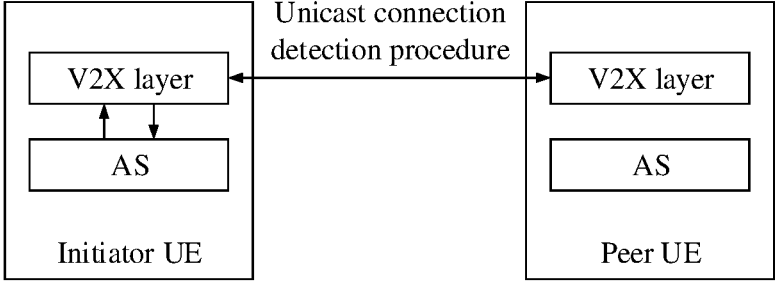
FIG. 4 is a schematic diagram of an example according to an embodiment of this application.

For ease of understanding, descriptions are provided herein with reference to an example diagram in FIG. 4. It is assumed that the first terminal device is initiator UE, and the second terminal device is peer UE. As shown in FIG. 4, an AS of the initiator UE sends fourth indication information to a V2X layer of the initiator UE. After receiving the fourth indication information, the V2X layer of the initiator UE may initiate a keep-alive detection procedure. It should be understood that, although arrows of the keep-alive detection procedure in FIG. 4 are drawn between V2X layers of the two UEs, this only indicates that the keep-alive procedure is terminated at the V2X layers of the two UEs from end to end, and does not mean that the V2X layer directly performs sending to the V2X layer, and the sending actually depends on the AS. Specifically, two messages of the keep-alive procedure may be reported by being carried on a user plane bearer or a signaling bearer of the corresponding unicast connection at the AS. If it is detected that the unicast connection exists, the V2X layer of the initiator UE sends an indication to the AS, to indicate that the unicast connection exists. Optionally, the fourth indication information may include identifier information of the unicast connection.

It should be understood that the method 300 may be implemented independently, or may be implemented in combination with the method 200. This is not limited in the embodiments of this application.

It should be further understood that sequence numbers of the foregoing processes do not mean execution sequences in various embodiments of this application. The execution sequences of the processes should be determined based on functions and internal logic of the processes, and should not be construed as any limitation on the implementation processes of the embodiments of this application.

In the embodiments of this application, unless there is a particular description or a logical conflict, terms and/or descriptions in different embodiments are consistent and may be mutually referenced. Technical features in different embodiments may be combined based on their internal logical relationship to form a new embodiment.

The connection release method according to the embodiments of this application is described in detail above with reference to FIG. 1 to FIG. 4. The following describes communication apparatuses according to the embodiments of this application with reference to FIG. 5 to FIG. 10. It should be understood that the technical features described in the method embodiments are also applicable to the following apparatus embodiments.

Figure 5:
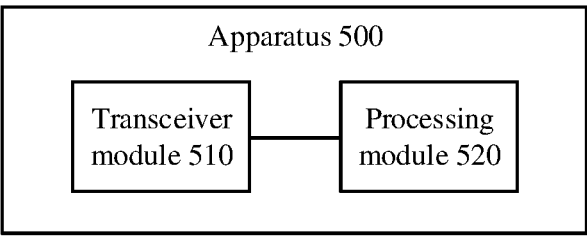
FIG. 5 is a schematic block diagram of a communication apparatus according to an embodiment of this application.

FIG. 5 is a schematic block diagram of a communication apparatus 500 according to an embodiment of this application. The apparatus 500 is configured to perform the method performed by the first terminal device in the foregoing method embodiment. Optionally, a specific form of the apparatus 500 may be a terminal device or a module (for example, a chip) in the terminal device. This is not limited in this embodiment of this application. For example, the apparatus 500 is a first terminal device, and the apparatus 500 includes a transceiver module 510 and a processing module 520.

The transceiver module 510 is configured to send a release request message and first identifier information to an access stratum of the first terminal device, where the release request message is used to request a second terminal device to release a unicast connection, and the first identifier information is used to identify the unicast connection.

The processing module 520 is configured to: obtain release indication information; and release, based on the release indication information and the first identifier information, a configuration of the access stratum corresponding to the unicast connection, where the unicast connection is a unicast connection on a sidelink, and the sidelink is a wireless transmission link between the first terminal device and a second terminal device.

In a possible implementation, that the processing module 520 is configured to obtain release indication information specifically includes: invoking the transceiver module 510 to send first indication information to the access stratum of the first terminal device, where the first indication information is used to indicate that the release request message is a unicast connection release request message, and the first indication information is the release indication information.

In a possible implementation, that the processing module 520 is configured to obtain release indication information specifically includes: invoking the transceiver module 510 to send the release request message to an access stratum of the second terminal device; and invoking the transceiver module 510 to receive a release acknowledgment message from the access stratum of the second terminal device, where the release acknowledgment message is used to respond to the release request message, and the release acknowledgment message is the release indication information.

In a possible implementation, the processing module 520 is further configured to: invoke the transceiver module 510 to send first indication information to the access stratum of the first terminal device, where the first indication information is used to indicate that the release request message is a unicast connection release request message; and invoke the transceiver module 510 to send a first RRC message to the second terminal device, where the first RRC message is used to indicate the second terminal device to release a configuration of an access stratum corresponding to the unicast connection. Correspondingly, that the processing module 520 is configured to obtain release indication information specifically includes: invoking the transceiver module 510 to receive a second RRC message from the second terminal device, where the second RRC message is used to respond to the first RRC message, and the second RRC message is the release indication information.

In a possible implementation, the transceiver module 510 is further configured to send the release request message to an access stratum of the second terminal device, the processing module 520 is further configured to release the unicast connection of an upper layer of the access stratum of the first terminal device. Correspondingly, that the processing module 520 is configured to obtain release indication information specifically includes: sending second indication information to the access stratum of the first terminal device, where the second indication information is used to notify the access stratum of the first terminal device that the upper layer of the first terminal device has released the unicast connection, and the second indication information is the release indication information.

In a possible implementation, the transceiver module 510 is further configured to receive a release acknowledgment message. Correspondingly, that the processing module 520 is configured to release the unicast connection of an upper layer of the access stratum of the first terminal device includes: releasing the unicast connection of the upper layer of the access stratum of the first terminal device based on the release acknowledgment message.

In a possible implementation, that the processing module 520 is configured to invoke the transceiver module 510 to send the second indication information to the access stratum of the first terminal device includes: after releasing the unicast connection of the upper layer of the access stratum of the first terminal device, invoking the transceiver module 510 to send the second indication information to the access stratum of the first terminal device.

In a possible implementation, the transceiver module 510 is further configured to send first signaling to a network device, where the first signaling includes the first identifier information. Correspondingly, that the processing module 520 is configured to obtain release indication information specifically includes: receiving third indication information from the network device, where the third indication information is used to indicate the first terminal device to release the configuration of the access stratum corresponding to the unicast connection, and the third indication information is the release indication information.

In a possible implementation, the transceiver module 510 is further configured to send a third RRC message to the second terminal device, where the third RRC message includes the release request message, and the third RRC message is used to indicate the second terminal device to release a configuration of an access stratum corresponding to the unicast connection. Correspondingly, that the processing module 520 is configured to obtain release indication information specifically includes: invoking the transceiver module 510 to receive a fourth RRC message from the second terminal device, where the fourth RRC message indicates that the access stratum of the second terminal device has successfully released the configuration of the access stratum corresponding to the unicast connection, the fourth RRC message includes a release acknowledgment message, the release acknowledgment message is used to indicate that an upper layer of the access stratum of the second terminal device has successfully released the unicast connection, and the fourth RRC message is the release indication information; and invoking the transceiver module 510 to deliver the release acknowledgment message in the fourth RRC message to the upper layer of the access stratum of the first terminal device.

In a possible implementation, the transceiver module 510 is further configured to send notification information to the network device, where the notification information is used to notify the network device that the unicast connection of the access stratum of the first terminal device has been released. Optionally, the notification information includes an updated destination identifier list.

In a possible implementation, the transceiver module 510 is further configured to send fourth indication information to the upper layer of the access stratum of the first terminal device, where the fourth indication information is used to indicate the upper layer of the access stratum of the first terminal device to detect the unicast connection.

In a possible implementation, the processing module 520 is further configured to determine to release the unicast connection.

Optionally, that the transceiver module 510 is configured to send detection indication information to the upper layer of the first terminal device specifically includes: sending the fourth indication information to the upper layer of the first terminal device based on preset time.

It should be understood that the apparatus 500 according to this embodiment of this application may correspond to the method performed by the first terminal device in the foregoing method embodiment, for example, the method in FIG. 2. In addition, the foregoing and other management operations and/or functions of the modules in the apparatus 500 are separately used to implement corresponding steps of the method performed by the first terminal device in the foregoing method embodiment. Therefore, the beneficial effects in the foregoing method embodiment can also be achieved. For brevity, details are not described herein again.

Alternatively, the apparatus 500 is configured to perform another embodiment of this application. The apparatus 500 may be a first terminal device, and specifically includes: a transceiver module 510, configured to send fourth indication information to an upper layer of an access stratum of the first terminal device, where the fourth indication information is used to indicate the upper layer of the access stratum of the first terminal device to detect a unicast connection; and a processing module 520, configured to detect the unicast connection based on the fourth indication information.

Optionally, that the transceiver module 510 is configured to send detection indication information to an upper layer of the first terminal device includes: sending the detection indication information to the upper layer of the first terminal device based on preset time.

Alternatively, the apparatus 500 is configured to perform another embodiment of this application. The apparatus 500 may be a first terminal device, and specifically includes: a transceiver module 510, configured to send fourth indication information to an upper layer of an access stratum of the first terminal device, where the fourth indication information is used to indicate the upper layer of the access stratum of the first terminal device to detect a unicast connection; and a processing module 520, configured to detect the unicast connection based on the fourth indication information.

Optionally, the fourth indication information includes identifier information of the unicast connection.

Optionally, the fourth indication information is used to indicate the upper layer of the access stratum of the first terminal device to initiate a keep-alive procedure for the unicast connection.

Optionally, a message of the keep-alive procedure is carried on a signaling bearer of the access stratum of the terminal device.

In a possible implementation, the transceiver module 510 is further configured to send a detection message to the second terminal device. The processing module is further configured to: if no acknowledgment message is received from the second terminal device after a timer expires, determine that the unicast connection does not exist, where the acknowledgment message is used to respond to the detection message.

Optionally, that the transceiver module 510 is configured to send fourth indication information to an upper layer of an access stratum of the first terminal device specifically includes: sending the fourth indication information to the upper layer of the access stratum of the first terminal device based on preset time.

Optionally, the preset time is implemented by using a timer.

It should be understood that the apparatus 500 according to this embodiment of this application may correspond to the method performed by the terminal device in the foregoing method embodiment, for example, the method in FIG. 3. In addition, the foregoing and other management operations and/or functions of the modules in the apparatus 500 are separately used to implement corresponding steps of the method performed by the first terminal device in the foregoing method embodiment. Therefore, the beneficial effects in the foregoing method embodiment can also be achieved. For brevity, details are not described herein again.

It should be further understood that each module in the apparatus 500 may be implemented in a form of software and/or hardware. This is not specifically limited. In other words, the apparatus 500 is presented in a form of functional modules. The "module" herein may be an application-specific integrated circuit (ASIC), a circuit, a processor and a memory that execute one or more software programs or firmware programs, an integrated logic circuit, and/or another component that can provide the foregoing function. Optionally, in a simple embodiment, a person skilled in the art may figure out that the apparatus 500 may be in a form shown in FIG. 6. The processing module 520 may be implemented by a processor 601 shown in FIG. 6. The transceiver module 1010 may be implemented by a transceiver 603 shown in FIG. 6. Specifically, the processor is implemented by executing a computer program stored in the memory. Optionally, when the apparatus 500 is a chip, a function and/or an implementation process of the transceiver module 510 may alternatively be implemented by a pin, a circuit, or the like. Optionally, the memory is a storage unit, for example, a register or a cache, in the chip. Alternatively, the storage unit may be a storage unit that is outside the chip and that is in a computer device, for example, a memory 602 shown in FIG. 6.

The transceiver module 510 may be an internal logical interface of the first terminal device, and is configured to implement layer-to-layer interaction in the first terminal device, for example, interaction between the access stratum and the upper layer.

Optionally, for hardware implementation, the transceiver module 510 may alternatively be a transceiver, and the transceiver (in FIG. 5, the transceiver module 510 is used as an example) constitutes a communication interface in a communication unit. It should be understood that the communication interface may be a software interface or a hardware interface. The communication interface may be a communication interface that includes wireless sending and receiving, or may be an interface for a digital signal input after a received radio signal is processed by another processing circuit, or may be a software or hardware interface that communicates with another module.

Figure 6:
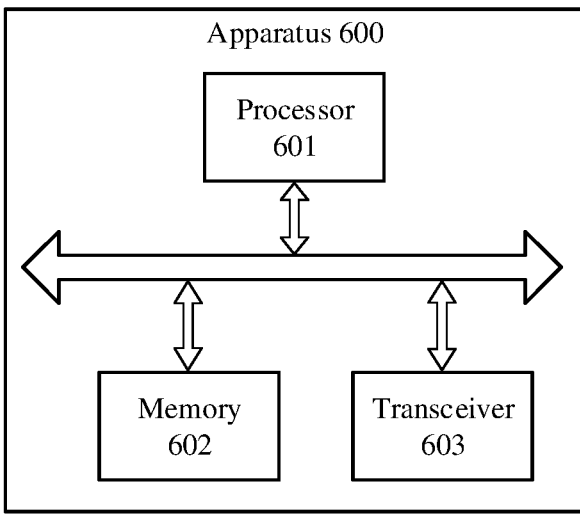
FIG. 6 is a schematic structural diagram of a communication apparatus according to an embodiment of this application.

FIG. 6 is a schematic structural diagram of a communication apparatus 600 according to an embodiment of this application. As shown in FIG. 6, the apparatus 600 includes a processor 601.

In a possible implementation, the apparatus 600 is a first terminal device, and the processor 601 is configured to invoke an interface to perform the following action: sending a release request message and first identifier information to an access stratum of the first terminal device, where the release request message is used to request a second terminal device to release a unicast connection, and the first identifier information is used to identify the unicast connection. The processor 601 is configured to: obtain release indication information; and release, based on the release indication information and the first identifier information, a configuration of the access stratum corresponding to the unicast connection.

In another possible implementation, the apparatus 600 is a terminal device, and the processor 601 is configured to invoke an interface to perform the following action: sending fourth indication information to an upper layer of an access stratum of the terminal device, where the fourth indication information is used to indicate the upper layer of the access stratum of the first terminal device to detect a unicast connection. The processor 601 is configured to detect the unicast connection based on the fourth indication information.

It should be understood that the processor 601 may invoke the interface to perform the foregoing sending and receiving actions. The invoked interface may be a logical interface or a physical interface. This is not limited. Optionally, the physical interface may be implemented by using a transceiver. Optionally, the apparatus 600 further includes a transceiver 603.

Optionally, the apparatus 600 further includes a memory 602, and the memory 602 may store program code in the foregoing method embodiment, so that the processor 601 invokes the program code.

Specifically, if the apparatus 600 includes the processor 601, the memory 602, and the transceiver 603, the processor 601, the memory 602, and the transceiver 603 communicate with each other through an inner connection path, to transmit a control signal and/or a data signal. In a possible design, the processor 601, the memory 602, and the transceiver 603 may be implemented by using a chip. The processor 601, the memory 602, and the transceiver 603 may be implemented in a same chip, or may be separately implemented in different chips, or functions of any two of the processor 601, the memory 602, and the transceiver 603 are implemented in one chip. The memory 602 may store the program code, and the processor 601 invokes the program code stored in the memory 602, to implement a corresponding function of the apparatus 600.

It should be understood that the apparatus 600 may be further configured to perform other steps and/or operations on a first terminal device side in the foregoing embodiment. For brevity, details are not described herein.

Figure 7:
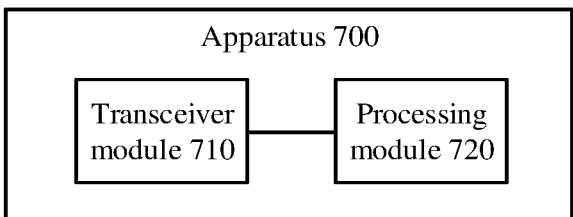
FIG. 7 is another schematic block diagram of a communication apparatus according to an embodiment of this application.

FIG. 7 is a schematic block diagram of a communication apparatus 700 according to an embodiment of this application. The apparatus 700 is configured to perform the method performed by the network device in the foregoing method embodiment. Optionally, a specific form of the apparatus 700 may be a network device or a module (for example, a chip) in the network device. This is not limited in this embodiment of this application. For example, the apparatus 700 is the network device, and the apparatus 700 includes a transceiver module 710 and a processing module 720.

The transceiver module 710 is configured to receive first signaling from a first terminal device, where the first signaling includes first identifier information, and the first identifier information is used to identify a unicast connection.

The processing module 720 is configured to delete, based on the first identifier information, a configuration corresponding to the unicast connection.

The transceiver module 710 is further configured to send third indication information to the first terminal device, where the third indication information is used to indicate the first terminal device to release a configuration of an access stratum corresponding to the unicast connection, the third indication information is release indication information, and the release indication information is used by the first terminal device to release the configuration of the access stratum corresponding to the unicast connection.

In a possible implementation, the transceiver module 710 is further configured to: receive notification information from the first terminal device, where the notification information is used to notify the network device that the unicast connection of the access stratum of the first terminal device has been released, and the notification information includes an updated destination identifier list.

It should be understood that the apparatus 700 according to this embodiment of this application may correspond to the method performed by the network device in the foregoing method embodiment, for example, the method in FIG. 3. In addition, the foregoing and other management operations and/or functions of the modules in the apparatus 700 are separately used to implement corresponding steps of the method performed by the network device in the foregoing method embodiment. Therefore, the beneficial effects in the foregoing method embodiment can also be achieved. For brevity, details are not described herein again.

It should be further understood that each module in the apparatus 700 may be implemented in a form of software and/or hardware. This is not specifically limited. In other words, the apparatus 700 is presented in a form of functional modules. The "module" herein may be an application-specific integrated circuit (ASIC), a circuit, a processor and a memory that execute one or more software programs or firmware programs, an integrated logic circuit, and/or another component that can provide the foregoing function. Optionally, in a simple embodiment, a person skilled in the art may figure out that the apparatus 700 may be in a form shown in FIG. 8. The processing module 720 may be implemented by a processor 801 shown in FIG. 8. The transceiver module 1010 may be implemented by a transceiver 803 shown in FIG. 8. Specifically, the processor is implemented by executing a computer program stored in the memory. Optionally, when the apparatus 700 is a chip, a function and/or an implementation process of the transceiver module 710 may alternatively be implemented by a pin, a circuit, or the like. Optionally, the memory is a storage unit, for example, a register or a cache, in the chip. Alternatively, the storage unit may be a storage unit that is outside the chip and that is in a computer device, for example, a memory 802 shown in FIG. 8.

Optionally, for hardware implementation, the transceiver module 710 may alternatively be a transceiver, and the transceiver (in FIG. 7, the transceiver module 710 is used as an example) constitutes a communication interface in a communication unit. It should be understood that the communication interface may be a software interface or a hardware interface. The communication interface may be a communication interface that includes wireless sending and receiving, or may be an interface for a digital signal input after a received radio signal is processed by another processing circuit, or may be a software or hardware interface that communicates with another module.

Figure 8:
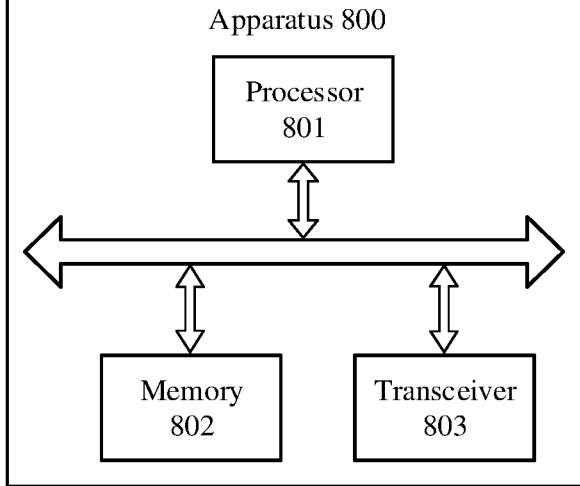
FIG. 8 is another schematic structural diagram of a communication apparatus according to an embodiment of this application.

FIG. 8 is a schematic structural diagram of a communication apparatus 800 according to an embodiment of this application. As shown in FIG. 8, the apparatus 800 includes a processor 801.

In a possible implementation, the processor 801 is configured to invoke an interface to perform the following action: receiving first signaling from a first terminal device, where the first signaling includes first identifier information, and the first identifier information is used to identify a unicast connection. The processor 801 is configured to delete, based on the first identifier information, a configuration corresponding to the unicast connection.

The processor 801 is alternatively configured to invoke an interface to perform the following action: sending third indication information to a first terminal device, where the third indication information is used to indicate the first terminal device to release a configuration of an access stratum corresponding to a unicast connection, the third indication information is release indication information, and the release indication information is used by the first terminal device to release the configuration of the access stratum corresponding to the unicast connection.

It should be understood that the processor 801 may invoke the interface to perform the foregoing sending and receiving actions. The invoked interface may be a logical interface or a physical interface. This is not limited. Optionally, the physical interface may be implemented by using a transceiver. Optionally, the apparatus 800 further includes a transceiver 803.

Optionally, the apparatus 800 further includes a memory 802, and the memory 802 may store program code in the foregoing method embodiment, so that the processor 801 invokes the program code.

Specifically, if the apparatus 800 includes the processor 801, the memory 802, and the transceiver 803, the processor 801, the memory 802, and the transceiver 803 communicate with each other through an inner connection path, to transmit a control signal and/or a data signal. In a possible design, the processor 801, the memory 802, and the transceiver 803 may be implemented by using a chip. The processor 801, the memory 802, and the transceiver 803 may be implemented in a same chip, or may be separately implemented in different chips, or functions of any two of the processor 801, the memory 802, and the transceiver 803 are implemented in one chip. The memory 802 may store the program code, and the processor 801 invokes the program code stored in the memory 802, to implement a corresponding function of the apparatus 800.

It should be understood that the apparatus 800 may be further configured to perform other steps and/or operations on a network device side in the foregoing embodiment. For brevity, details are not described herein.

Figure 9:
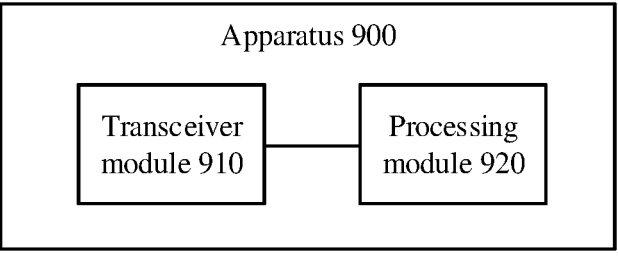
FIG. 9 is still another schematic block diagram of a communication apparatus according to an embodiment of this application.

FIG. 9 is a schematic block diagram of a communication apparatus 900 according to an embodiment of this application. The apparatus 900 is configured to perform the method performed by the terminal device in the foregoing method embodiment. Optionally, a specific form of the apparatus 900 may be a terminal device or a module (for example, a chip) in the terminal device. This is not limited in this embodiment of this application. For example, the apparatus 900 is a second terminal device, and the apparatus 900 includes a transceiver module 910 and a processing module 920.

The transceiver module 910 is configured to receive a first RRC message from a first terminal device, where the first RRC message is used to indicate the second terminal device to release a configuration of an access stratum corresponding to a unicast connection.

The processing module 920 is configured to release, based on the first RRC message, the configuration of the access stratum corresponding to the unicast connection.

The transceiver module 910 is further configured to send a second RRC message to the first terminal device, where the second RRC message is used to respond to the first RRC message.

Alternatively, the apparatus 900 is configured to perform another method, which is specifically as follows:

The transceiver module 910 is configured to receive a release request message, where the release request message is used to indicate the second terminal device to release a unicast connection.

The processing module 920 is configured to generate a release acknowledgment message, where the release acknowledgment message is used to respond to the release request message.

The transceiver module 910 is further configured to send the release acknowledgment message and fifth indication information to an access stratum of the second terminal device, where the fifth indication information is used to indicate the access stratum of the second terminal device to release a configuration of the access stratum corresponding to the unicast connection; and the transceiver module 910 is further configured to: send the release acknowledgment message to a first terminal device; and release the configuration of the access stratum corresponding to the unicast connection.

Alternatively, the apparatus 900 is configured to perform still another method, which is specifically as follows:

The transceiver module 910 is configured to receive a third RRC message from a first terminal device, where the third RRC message includes a release request message, and the third RRC message is used to indicate the second terminal device to release a configuration of an access stratum corresponding to a unicast connection.

The transceiver module 910 is further configured to send the release request message to an upper layer of the access stratum of the second terminal device.

The processing module 920 is configured to: generate a release acknowledgment message, and send the release acknowledgment message to the access stratum of the second terminal device.

The transceiver module 910 is further configured to send a fourth RRC message to the first terminal device, where the fourth RRC message indicates that the access stratum of the second terminal device has successfully released the configuration of the access stratum corresponding to the unicast connection, the fourth RRC message includes the release acknowledgment message, and the release acknowledgment message is used to indicate that the upper layer of the access stratum of the second terminal device has successfully released the unicast connection.

It should be understood that the apparatus 900 according to this embodiment of this application may correspond to the method performed by the second terminal device in the foregoing method embodiment. In addition, the foregoing and other management operations and/or functions of the modules in the apparatus 900 are separately used to implement corresponding steps of the method performed by the terminal device in the foregoing method embodiment. Therefore, the beneficial effects in the foregoing method embodiment can also be achieved. For brevity, details are not described herein again.

It should be further understood that each module in the apparatus 900 may be implemented in a form of software and/or hardware. This is not specifically limited. In other words, the apparatus 900 is presented in a form of functional modules. The "module" herein may be an application-specific integrated circuit (ASIC), a circuit, a processor and a memory that execute one or more software programs or firmware programs, an integrated logic circuit, and/or another component that can provide the foregoing function. Optionally, in a simple embodiment, a person skilled in the art may figure out that the apparatus 900 may be in a form shown in FIG. 10. The processing module 920 may be implemented by a processor 1001 shown in FIG. 10. The transceiver module 1010 may be implemented by a transceiver 1003 shown in FIG. 10. Specifically, the processor is implemented by executing a computer program stored in the memory. Optionally, when the apparatus 900 is a chip, a function and/or an implementation process of the transceiver module 910 may alternatively be implemented by a pin, a circuit, or the like. Optionally, the memory is a storage unit, for example, a register or a cache, in the chip. Alternatively, the storage unit may be a storage unit that is outside the chip and that is in a computer device, for example, a memory 1002 shown in FIG. 10.

The transceiver module 910 may be an internal logical interface of the terminal device, and is configured to implement layer-to-layer interaction in the terminal device, for example, interaction between the access stratum and the upper layer.

Optionally, for hardware implementation, the transceiver module 910 may alternatively be a transceiver, and the transceiver (in FIG. 9, the transceiver module 910 is used as an example) constitutes a communication interface in a communication unit. It should be understood that the communication interface may be a software interface or a hardware interface. The communication interface may be a communication interface that includes wireless sending and receiving, or may be an interface for a digital signal input after a received radio signal is processed by another processing circuit, or may be a software or hardware interface that communicates with another module.

Figure 10:
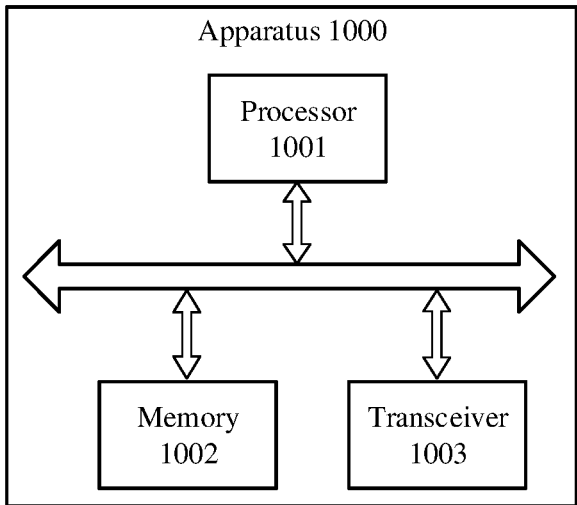
FIG. 10 is still another schematic structural diagram of a communication apparatus according to an embodiment of this application.

FIG. 10 is a schematic structural diagram of a communication apparatus 1000 according to an embodiment of this application. As shown in FIG. 10, the apparatus 1000 includes a processor 1001.

In a possible implementation, the processor 1001 is configured to invoke an interface to perform the following action: receiving a first RRC message from a first terminal device, where the first RRC message is used to indicate a second terminal device to release a configuration of an access stratum corresponding to a unicast connection. The processor 1001 is configured to release, based on the first RRC message, the configuration of the access stratum corresponding to the unicast connection. The processor 1001 is further configured to invoke the interface to perform the following action: sending a second RRC message to the first terminal device, where the second RRC message is used to respond to the first RRC message.

In another possible implementation, the processor 1001 is configured to invoke an interface to perform the following action: receiving a release request message, where the release request message is used to indicate a second terminal device to release a unicast connection. The processor 1001 is configured to generate a release acknowledgment message, where the release acknowledgment message is used to respond to the release request message. The processor 1001 is further configured to invoke the interface to perform the following action: sending the release acknowledgment message and fifth indication information to an access stratum of the second terminal device, where the fifth indication information is used to indicate the access stratum of the second terminal device to release a configuration of the access stratum corresponding to the unicast connection. The processor loot is further configured to invoke the interface to perform the following action: sending the release acknowledgment message to a first terminal device. The processor 1001 is configured to release the configuration of the access stratum corresponding to the unicast connection.

In still another possible implementation, the processor 1001 is configured to invoke an interface to perform the following actions: receiving a third RRC message from a first terminal device, where the third RRC message includes a release request message; and the third RRC message is used to indicate a second terminal device to release a configuration of an access stratum corresponding to a unicast connection; and sending the release request message to an upper layer of the access stratum of the second terminal device. The processor 1001 is further configured to: generate a release acknowledgment message, and send the release acknowledgment message to the access stratum of the second terminal device. The processor 1001 is further configured to invoke the interface to perform the following action: sending a fourth RRC message to the first terminal device, where the fourth RRC message indicates that the access stratum of the second terminal device has successfully released the configuration of the access stratum corresponding to the unicast connection, the fourth RRC message includes the release acknowledgment message, and the release acknowledgment message is used to indicate that the upper layer of the access stratum of the second terminal device has successfully released the unicast connection.

It should be understood that the processor 1001 may invoke the interface to perform the foregoing sending and receiving actions. The invoked interface may be a logical interface or a physical interface. This is not limited. Optionally, the physical interface may be implemented by using a transceiver. Optionally, the apparatus 1000 further includes a transceiver 1003.

Optionally, the apparatus 1000 further includes a memory 1002, and the memory 1002 may store program code in the foregoing method embodiment, so that the processor 1001 invokes the program code.

Specifically, if the apparatus 1000 includes the processor 1001, the memory 1002, and the transceiver 1003, the processor 1001, the memory 1002, and the transceiver 1003 communicate with each other through an inner connection path, to transmit a control signal and/or a data signal. In a possible design, the processor 1001, the memory 1002, and the transceiver 1003 may be implemented by using a chip. The processor 1001, the memory 1002, and the transceiver 1003 may be implemented in a same chip, or may be separately implemented in different chips, or functions of any two of the processor 1001, the memory 1002, and the transceiver 1003 are implemented in one chip. The memory 1002 may store the program code, and the processor 1001 invokes the program code stored in the memory 1002, to implement a corresponding function of the apparatus 1000.

It should be understood that the apparatus 1000 may be further configured to perform other steps and/or operations on a second terminal device side in the foregoing embodiment. For brevity, details are not described herein.

The methods disclosed in the foregoing embodiments of this application may be applied to a processor or may be implemented by the processor. The processor may be an integrated circuit chip and has a signal processing capability. In an implementation process, the steps in the foregoing method embodiments can be completed by using a hardware integrated logical circuit in the processor, or by using instructions in a form of software. The processor may be a general-purpose processor, a digital signal processor (DSP), an application-specific integrated circuit (ASIC), a field programmable gate array (FPGA) or another programmable logic device, a discrete gate, a transistor logic device, a discrete hardware component, a system on chip (SoC), a central processing unit (CPU), a network processor (NP), a digital signal processing circuit (DSP), a micro controller unit (MCU), a programmable controller (PLD), or another integrated chip. The processor may implement or perform the methods, steps, and logical block diagrams that are disclosed in the embodiments of this application. The general-purpose processor may be a microprocessor, any conventional processor, or the like. The steps of the methods disclosed with reference to the embodiments of this application may be directly performed by a hardware decoding processor, or may be performed by a combination of hardware and software modules in the decoding processor. The software module may be located in a mature storage medium in the art, such as a random access memory, a flash memory, a read-only memory, a programmable read-only memory, an electrically erasable programmable memory, or a register. The storage medium is located in the memory, and the processor reads information in the memory and completes the steps in the foregoing methods in combination with hardware of the processor.

It may be understood that the memory in the embodiments of this application may be a volatile memory or a non-volatile memory, or may include both a volatile memory and a non-volatile memory. The non-volatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), and is used as an external cache. Based on a description that is used as an example instead of a limitation, many forms of RAMs may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DR RAM). It should be noted that the memories in the systems and methods described in this specification include but are not limited to these memories and any memory of another proper type.

It should be understood that in the embodiments of this application, numbers "first", "second", and the like introduced for the terms are merely used to distinguish between different objects, for example, to distinguish between different messages, and do not constitute a limitation on the scope of the embodiments of this application. The embodiments of this application are not limited thereto.

It should be further understood that sequence numbers of the foregoing processes do not mean execution sequences in various embodiments of this application. The execution sequences of the processes should be determined based on functions and internal logic of the processes. Various numerical numbers or sequence numbers in the foregoing processes are merely used for differentiation for ease of description, and should not constitute any limitation on the implementation process of the embodiments of this application.

It should be further understood that the term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

Unless otherwise specified, an expression used in this application similar to an expression that "an item includes one or more of the following: A, B, and C" usually means that the item may be any one of the following: A; B; C; A and B; A and C; B and C; A, B, and C; A and A; A, A, and A; A, A, and B; A, A, and C; A, B, and B; A, C, and C; B and B; B, B and B; B, B and C; C and C; C, C, and C; and another combination of A, B and C. In the foregoing descriptions, three elements A, B, and C are used as an example to describe an optional case of the item. When an expression is "the item includes at least one of the following: A, B, . . . , and X", in other words, more elements are included in the expression, a case to which the item is applicable may also be obtained according to the foregoing rule.

A person of ordinary skill in the art may be aware that, the units and algorithm steps in the examples described with reference to the embodiments disclosed in this specification may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in other manners. For example, the described apparatus embodiment is merely an example. For example, division into the units is merely logical function division and may be other division in actual implementations. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions in the embodiments.

In addition, the function units in the embodiments of this application may be integrated into one processing unit, or each of the units may exist alone physically, or two or more units may be integrated into one unit.

When the functions are implemented in a form of a software function unit and sold or used as an independent product, the functions may be stored in a computer-readable storage medium. Based on such an understanding, the technical solutions in this application essentially, or the part contributing to the conventional technology, or some of the technical solutions may be implemented in a form of a software product. The computer software product is stored in a storage medium, and includes several instructions for instructing a computer device (which may be a personal computer, a server, a network device, or the like) to perform all or some of the steps of the method described in the embodiments of this application. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method, comprising:

sending, by an access stratum of a first terminal device, first indication information to an upper layer of the access stratum of the first terminal device, wherein the upper layer of the access stratum of the first terminal device is a non-access stratum layer, and the first indication information indicates to the upper layer of the access stratum of the first terminal device to detect whether a previously-established unicast connection is still valid and to initiate a keep-alive procedure for the unicast connection, and wherein a message of the keep-alive procedure is carried on a signaling bearer of the access stratum of the first terminal device; and detecting, by the upper layer of the access stratum of the first terminal device, the unicast connection according to the first indication information.

2. The method according to claim 1, wherein the first indication information comprises identifier information of the unicast connection.

3. The method according to claim 2, wherein the identifier information of the unicast connection is allocated by the upper layer of the access stratum of the first terminal device to the unicast connection.

4. The method according to claim 1, the detecting further comprising:

sending, by the first terminal device, a detection message to a second terminal device; and in response to the first terminal device receiving no acknowledgment message in response to the detection message from the second terminal device after a timer expires, determining, by the first terminal device, that the previously-established unicast connection does not currently exist, wherein the unicast connection is a sidelink connection, and the sidelink connection is a wireless transmission link between the first terminal device and the second terminal device.

5. The method according to claim 1, further comprising:

sending, by the upper layer of the access stratum of the first terminal device, a release request message and first identifier information to the access stratum of the first terminal device, wherein the release request message requests a second terminal device to release the unicast connection, and the first identifier information identifies the unicast connection;

sending, by the access stratum of the first terminal device, the release request message to an access stratum of the second terminal device;

receiving, by the upper layer of the access stratum of the first terminal device, a release acknowledgment message from the second terminal device;

releasing, by the upper layer of the access stratum of the first terminal device, the unicast connection of the upper layer of the access stratum of the first terminal device;

sending, by the upper layer of the access stratum of the first terminal device, second indication information to the access stratum of the first terminal device, wherein the second indication information notifies the access stratum of the first terminal device that the upper layer of the first terminal device has released the unicast connection; and releasing, by the access stratum of the first terminal device according to the second indication information, a configuration of the access stratum corresponding to the unicast connection.

6. The method of claim 5, further comprising:

sending, by the first terminal device, notification information to a network device, wherein the notification information notifies the network device that the unicast connection of the access stratum of the first terminal device has been released, and the notification information includes an updated destination identifier list that does not include a destination identifier corresponding to the released unicast connection.

7. The method according to claim 1, wherein the upper layer of the access stratum of the first terminal device is an application layer or a vehicle-to-everything (V2X) layer.

8. The method according to claim 1, wherein the AS stratum includes one or more of the following: a service data adaptation protocol layer, a radio resource control layer, a sidelink radio resource control layer, a media access control layer, or a physical layer.

9. The method according to claim 1, wherein the upper layer of the access stratum of the first terminal device is a layer that is higher than a sidelink radio resource control layer.

10. A device, wherein the device is a first terminal device or an apparatus included in the first terminal device, and the device comprises:

at least one processor, and one or more non-transitory memories coupled to the at least one processor and storing programming instructions that are executable by the at least one processor, wherein the programming instructions comprise instructions for:

sending, by an access stratum of the first terminal device, first indication information to an upper layer of the access stratum of the first terminal device, the first indication information indicating to the upper layer of the access stratum of the first terminal device to detect whether a previously-established unicast connection is still valid and to initiate a keep-alive procedure for the unicast connection, wherein the upper layer of the access stratum of the first terminal device is a non-access stratum layer, and wherein a message of the keep-alive procedure is carried on a signaling bearer of the access stratum of the first terminal device; and detecting, by the upper layer of the access stratum of the first terminal device, the unicast connection according to the first indication information.

11. The device according to claim 10, wherein the first indication information comprises identifier information of the unicast connection.

12. The device according to claim 10, wherein the programming instructions for the detecting further include instructions for:

sending a detection message to a second terminal device; and in response to the first terminal device receiving no acknowledgment message in response to the detection message from the second terminal device after a timer expires, determining that the previously-established unicast connection does not currently exist, wherein the unicast connection is a sidelink connection, and the sidelink connection is a wireless transmission link between the first terminal device and the second terminal device.

13. The device according to claim 10, wherein sending, by the access stratum of the first terminal device, the first indication information to the upper layer of the access stratum of the first terminal device comprises:

sending, by the access stratum of the first terminal device, the first indication information to the upper layer of the access stratum of the first terminal device according to a preset time.

14. The device according to claim 13, wherein the preset time is implemented by a timer.

15. The device according to claim 10, wherein the programming instructions further include instructions for:

sending, by the upper layer of the access stratum of the first terminal device, a release request message and first identifier information to the access stratum of the first terminal device, wherein the release request message requests a second terminal device to release the unicast connection, and the first identifier information identifies the unicast connection;

sending, by the access stratum of the first terminal device, the release request message to an access stratum of the second terminal device;

receiving, by the upper layer of the access stratum of the first terminal device, a release acknowledgment message from the second terminal device;

releasing, by the upper layer of the access stratum of the first terminal device, the unicast connection of the upper layer of the access stratum of the first terminal device;

sending, by the upper layer of the access stratum of the first terminal device, second indication information to the access stratum of the first terminal device, wherein the second indication information notifies the access stratum of the first terminal device that the upper layer of the first terminal device has released the unicast connection; and releasing, by the access stratum of the first terminal device according to the second indication information, a configuration of the access stratum corresponding to the unicast connection.

16. A non-transitory computer-readable storage medium storing at least one computer program, the at least one computer program being executable by one or more processors, and when the at least one computer program is executed, the at least one computer program causes the one or more processors to perform operations comprising:

sending, by an access stratum of a first terminal device, first indication information to an upper layer of the access stratum of the first terminal device, the first indication information indicating to the upper layer of the access stratum of the first terminal device to detect whether a previously-established unicast connection is still valid and to initiate a keep-alive procedure for the unicast connection, wherein the upper layer of the access stratum of the first terminal device is a non-access stratum layer, and wherein a message of the keep-alive procedure is carried on a signaling bearer of the access stratum of the first terminal device; and detecting, by the upper layer of the access stratum of the first terminal device, the unicast connection according to the first indication information.

17. The non-transitory computer-readable storage medium according to claim 15, wherein the detecting further comprises:

sending, by the first terminal device, a detection message to a second terminal device; and in response to the first terminal device receiving no acknowledgment message in response to the detection message from the second terminal device after a timer expires, determining, by the first terminal device, that the previously-established unicast connection does not currently exist, wherein the unicast connection is a sidelink connection, and the sidelink connection is a wireless transmission link between the first terminal device and the second terminal device.

* * * * *